US012786589B2

(12) United States Patent
Park et al.

(10) Patent No.: US 12,786,589 B2
(45) Date of Patent: Nov. 3, 2026

(54) PIXEL ARRAY, IMAGE SENSOR, AND ELECTRONIC DEVICE WITH MULTIPLE AUTOFOCUS MODES

(71) Applicant: SAMSUNG ELECTRONICS CO., LTD., Suwon-si (KR)

(72) Inventors: Dong-Jin Park, Suwon-si (KR); Jeehong Lee, Suwon-si (KR); Sunghyuk Yim, Suwon-si (KR); Wooseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 18/655,983

(22) Filed: May 6, 2024

(65) Prior Publication Data

US 2025/0071442 A1 Feb. 27, 2025

(30) Foreign Application Priority Data

Aug. 24, 2023 (KR) ........................ 10-2023-0111143

(51) Int. Cl.
*H04N 25/77* (2023.01)

(52) U.S. Cl.
CPC .................................. *H04N 25/77* (2023.01)

(58) Field of Classification Search
CPC ...... H04N 25/77; H04N 23/672; H04N 25/11; H04N 25/134; H04N 25/79; H04N 25/704; H04N 25/68; H10F 39/8063
See application file for complete search history.

(56) References Cited

U.S. PATENT DOCUMENTS 10,412,349 B2 9/2019 Hwang et al.
10,440,301 B2 10/2019 Li et al.
11,064,134 B2 7/2021 Liu et al.
11,252,381 B2 2/2022 Pang et al.
11,258,993 B2 2/2022 Hoshino
11,367,743 B2 6/2022 Yang et al.
2019/0052823 A1* 2/2019 Jung .................... H04N 25/704
2020/0314362 A1 10/2020 Roh et al.
2022/0165766 A1* 5/2022 Jeong .................. H10F 39/8023
2022/0190023 A1* 6/2022 Jeong .................. H10F 39/8063
2023/0066376 A1* 3/2023 Jeong .................. H10F 39/8057
2023/0090827 A1* 3/2023 Li ........................ H04N 25/704
348/278

* cited by examiner

*Primary Examiner* — Gevell V Selby
(74) *Attorney, Agent, or Firm* — Sughrue Mion, PLLC

(57) ABSTRACT

A pixel array is provided. The pixel array includes: a plurality of pixels in a matrix, the plurality of pixels including a first pixel, a second pixel and a third pixel adjacent the second pixel; a plurality of micro lenses, the plurality of micro lenses including a first micro lens and a second micro lens. Each of the plurality of pixels includes a plurality of photoelectric conversion elements adjacent to each other in a first direction. The first micro lens extends across the plurality of photoelectric conversion elements of the first pixel, and the second micro lens extends in the first direction or a second direction across the second pixel and the third pixel.

20 Claims, 19 Drawing Sheets

110_2

PIXEL ARRAY, IMAGE SENSOR, AND ELECTRONIC DEVICE WITH MULTIPLE AUTOFOCUS MODES

CROSS-REFERENCE TO RELATED APPLICATION

This application claims priority to Korean Patent Application No. 10-2023-0111143, filed on Aug. 24, 2023, in the Korean Intellectual Property Office, the disclosure of which is incorporated by reference herein in its entirety.

BACKGROUND

The present disclosure relates to a pixel array, an image sensor, and an electronic device.

An image sensor is a device that converts a light signal into an electrical signal, and may include a charge coupled device (CCD) image sensor, a complementary metal oxide semiconductor (CMOS) image sensor, etc.

An autofocus (AF) function to automatically focus on a subject may be utilized in the image sensor. Phase difference auto focusing (PAF) may be used to adjust a focal length based on a phase difference of light signals detected at different locations.

SUMMARY

Embodiments provide an image sensor operating in a plurality of autofocus modes in consideration of accuracy and speed and an electronic device controlling the image sensor.

According to an aspect of an embodiment, a pixel array includes: a plurality of pixels in a matrix, the plurality of pixels including a first pixel, a second pixel and a third pixel adjacent the second pixel; a plurality of micro lenses, the plurality of micro lenses including a first micro lens and a second micro lens. Each of the plurality of pixels includes a plurality of photoelectric conversion elements adjacent to each other in a first direction. The first micro lens extends across the plurality of photoelectric conversion elements of the first pixel, and the second micro lens extends in the first direction or a second direction across the second pixel and the third pixel.

According to another aspect of an embodiment, an image sensor includes: a pixel array including a plurality of pixels in a matrix and a plurality of micro lenses, the plurality of pixels including a first pixel, a second pixel and a third pixel adjacent the second pixel, and the plurality of micro lenses including a first micro lens and a second micro lens; a row decoder circuit configured to provide a transfer control signal to the pixel array through a plurality of control signal lines; a control logic circuit configured to control the row decoder circuit; and an image signal processing logic circuit configured to output image data and phase data based on an output of the pixel array. Each of the plurality of pixels includes a plurality of photoelectric conversion elements adjacent to each other in a first direction. The first micro lens extends across the plurality of photoelectric conversion elements of the first pixel, and the second micro lens extends in the first direction or a second direction across the second pixel and the third pixel.

According to another aspect of an embodiment, an electronic device includes: an image sensing device including a pixel array, the pixel array including a plurality of pixels in a matrix, a plurality of micro lenses and a logic circuit configured to control the pixel array, and the image sensing device being configured to output image data and phase data based on an output of the pixel array; and a processor configured to receive the image data and the phase data from the image sensing device, to obtain a disparity of the phase data based on the phase data, and to provide a control signal to the image sensing device based on the disparity. The pixel array includes a plurality of pixel groups including the plurality of pixels. The plurality of pixels includes a first pixel, a second pixel and a third pixel adjacent the second pixel. The plurality of micro lenses includes a first micro lens and a second micro lens. Each of the plurality of pixels includes a plurality of photoelectric conversion elements adjacent to each other in a first direction. The first micro lens extends across the plurality of photoelectric conversion elements of the first pixel, and the second micro lens extends in the first direction or a second direction across the second pixel and the third pixel.

BRIEF DESCRIPTION OF DRAWINGS

The above and other aspects and features will be more apparent from the following description of embodiments, taken in conjunction with reference to the accompanying drawings.

DETAILED DESCRIPTION

Below, embodiments of the present disclosure will be described in conjunction with the accompanying drawings. Embodiments described herein are example embodiments, and thus, the present disclosure is not limited thereto, and may be realized in various other forms. Each embodiment provided in the following description is not excluded from being associated with one or more features of another example or another embodiment also provided herein or not provided herein but consistent with the present disclosure. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. It will be also understood that, even if a certain step or operation of manufacturing an apparatus or structure is described later than another step or operation, the step or operation may be performed later than the other step or operation unless the other step or operation is described as being performed after the step or operation.

Figure 1:
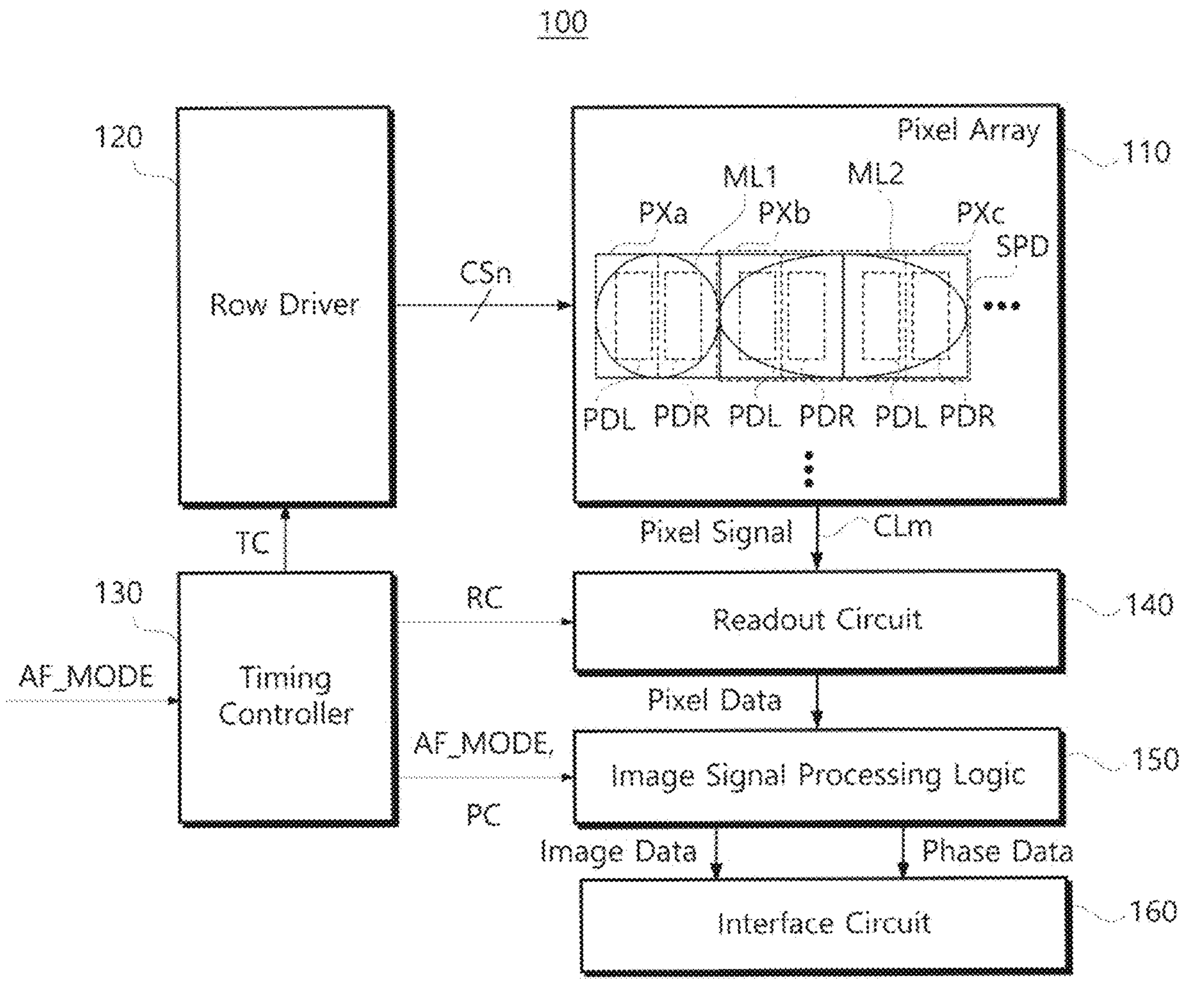
FIG. 1 is a block diagram of an image sensor according to an embodiment.

FIG. 1 is a block diagram describing an image sensor 100 according to an embodiment. Referring to FIG. 1, the image sensor 100 may include a pixel array 110, a row driver 120, a timing controller 130, a readout circuit 140, image signal processing logic 150, and an interface circuit 160.

The pixel array 110 includes a plurality of pixels. The plurality of pixels may be arranged, for example, in a matrix. The pixel array 110 may receive a plurality of pixel driving signals CSn, such as a selection signal, a reset signal, and a transfer control signal, from the row driver 120. The pixel array 110 may operate under control of the received pixel driving signals CSn. Each of the pixels of the image sensor 100 may convert a light signal to an electrical signal through a photoelectric conversion element. The electrical signals respectively generated by the pixels may be provided to the readout circuit 140 through a plurality of column lines CLm. The readout circuit 140 includes an analog-to-digital converter.

The photoelectric conversion element may be a photodiode (PD). The photodiode may be a photoelectric conversion element that generates charges in proportion to a light signal incident onto a pixel. Each pixel may accumulate corresponding charges. The photoelectric conversion element may include one of a photodiode (PD), a photocapacitor, a photogate, a pinned photodiode (PPD), a partially pinned photodiode, an organic photo diode (OPD), and a quantum dot (QD), or a combination thereof. Embodiments will be described under the condition that the photoelectric conversion element is the photodiode (PD). However, other photoelectric conversion elements, including those mentioned above, may be used as the photoelectric conversion element, and the photoelectric conversion element is not limited to the photodiode (PD).

Each of the plurality of pixels of the image sensor 100 according to an embodiment includes a plurality of photoelectric conversion elements. Each of the pixels includes at least two photoelectric conversion elements. A plurality of photoelectric conversion elements of each pixel may be disposed adjacent to each other in one of a row direction or a column direction of the pixel array 110.

At least two photoelectric conversion elements of each pixel may generate photoelectrons independently of each other. Depending on autofocus mode, the photoelectric conversion elements of the pixel may respectively generate individual pixel signals or may generate an integrated pixel signal. For example, in one mode, a pixel may generate a single integrated pixel signal. For example, in another mode, a pixel may generate a multiple pixel signals respectively corresponding to the photoelectric conversion elements.

In some of the plurality of pixels, a plurality of photoelectric conversion elements of one pixel shares the same micro lens. For example, in a first pixel PXa, at least one first photoelectric conversion element PDL disposed in a left direction (or an upward direction) with respect to the optical axis of a micro lens ML1 and at least one second photoelectric conversion element PDR disposed in a right direction (or a downward direction) with respect to the optical axis of a micro lens ML1 may share the same single micro lens ML1.

In others of the plurality of pixels, two pixels share one micro lens. Accordingly, at least four photoelectric conversion elements share one micro lens. For example, a first photoelectric conversion element PDL and a second photoelectric conversion element PDR of a second pixel PXb may be disposed in a left direction with respect to the optical axis of a micro lens ML2. A first photoelectric conversion element PDL and a second photoelectric conversion element PDR of a third pixel PXc may be disposed in the right direction with respect to the optical axis of the micro lens ML2. Accordingly, the third pixel PXc may be disposed adjacent to the second pixel PXb in the row direction. The second pixel PXb and the third pixel PXc may share the same single micro lens ML2.

An example in which the third pixel PXc is disposed adjacent to the second pixel PXb in the row direction is illustrated in FIG. 1. However, according to an embodiment, the third pixel PXc may be disposed adjacent to the second pixel PXb in the column direction.

When a plurality of photoelectric conversion elements of one pixel share one micro lens, the pixel may be called a dual photodiode pixel. For example, the first pixel PXa may be referred to as a dual photodiode pixel. When a plurality of pixels share one micro lens, the plurality of pixels may constitute a super photodiode pixel. For example, the second pixel PXb and the third pixel PXc may be collectively referred to as a super photodiode pixel SPD.

A plurality of pixels constituting a super photodiode pixel may be disposed adjacent to each other in the row direction or the column direction. One of plurality of pixels constituting the super photodiode pixel may be disposed adjacent to a dual photodiode pixel.

The row driver 120 may select one of rows of the pixel array 110 under control of the timing controller 130. The row driver 120 may generate the selection signal for the purpose of selecting one of the plurality of rows. The row driver 120 may activate pixels corresponding to the selected row. Pixel signals sampled from the pixels of the selected row may be transferred to an analog-to-digital converter of the readout circuit 140. A pixel signal may include a reset level signal and a pixel level signal.

The row driver 120 of the image sensor 100 according to an embodiment may allow a plurality of photoelectric conversion elements of each pixel to differently operate, depending on an autofocus mode control signal AF_MODE. The image sensor 100 may operate in a plurality of autofocus modes.

For example, in a first autofocus mode, the row driver 120 may control a plurality of photoelectric conversion elements of each pixel to operate independently of each other. Accordingly, pixel data may be generated based on photoelectrons of the plurality of photoelectric conversion elements of each pixel. In this case, phase data may be generated based on pixel data of a dual photodiode pixel. That is, phase data may be generated based on photoelectrons generated by each of the first and second photoelectric conversion elements PDL and PDR of the first pixel PXa.

For example, in a second autofocus mode, the row driver 120 may control a plurality of photoelectric conversion elements of each pixel to simultaneously operate for each pixel. Accordingly, pixel data may be generated in units of pixel. In this case, phase data may be generated based on pixel data of the second and third pixels PXb and PXc constituting the super photodiode pixel SPD. That is, each of the second and third pixels PXb and PXc may not generate pixel data for each photoelectric conversion element. Phase data may be generated based on pixel data generated from the second pixel PXb and pixel data generated from the third pixel PXc.

In the first autofocus mode, a focal length of a camera may be adjusted by using phase data that are based on each of a plurality of photoelectric conversion elements of a dual photodiode pixel. Accordingly, the auto focusing may be accurately performed. In the second autofocus mode, a focal length of a camera may be adjusted by using phase data that are based on each of pixels constituting a super photodiode pixel. Accordingly, the auto focusing may be performed at high speed, and image data may be provided at a high frame rate. As a result, an autofocus mode suitable for a characteristic of an application or a photographing environment may be selected from the plurality of autofocus modes.

The analog-to-digital converter of the readout circuit 140 may convert the reset level signal and the pixel level signal to a digital signal. For example, the analog-to-digital converter may sample the reset level signal and the pixel level signal in a correlated double sampling manner and may convert a sampling result to pixel data being a digital signal. To this end, a correlate double sampler (CDS) may be further disposed in front of the analog-to-digital converter.

In the pixels of the image sensor 100 according to an embodiment, the pixel level signal may be sampled for each photoelectric conversion element or for each pixel. Also, the reset level signal may be sampled for each photoelectric conversion element, or the reset level signal may be sampled for each pixel.

The readout circuit 140 may include an output buffer. The output buffer may latch the digital-converted pixel data for each column so as to be provided to the image signal processing logic 150. The output buffer may temporarily store pixel data under control of the timing controller 130 and may provide the sequentially stored pixel data to the image signal processing logic 150.

The timing controller 130 may control the pixel array 110, the row driver 120, the readout circuit 140, and the image signal processing logic 150. The timing controller 130 may provide a timing control signal TC to the row driver 120. The timing controller 130 may provide a reference code RC to the readout circuit 140. The timing controller 130 may provide a control signal PC and the autofocus mode control signal AF_MODE to the image signal processing logic 150. The timing controller 130 may include a logic control circuit, a phase locked loop (PLL) circuit, and/or a timing control circuit, etc.

The image signal processing logic 150 may process pixel data to generate image data and phase data. The image signal processing logic 150 outputs the image data and the phase data through the interface circuit 160.

In response to the autofocus mode control signal AF_MODE, the image signal processing logic 150 according to an embodiment may generate the phase data based on outputs of different pixels. For example, in the first autofocus mode, the image signal processing logic 150 may generate the phase data based on pixel data of the dual photodiode pixel PXa. In the second autofocus mode, the image signal processing logic 150 may generate the phase data based on pixel data of the pixels PXb and PXc constituting the super photodiode pixel SPD. This will be described in detail with reference to FIGS. 5 to 8.

An application processor may be provided with the image data and the phase data from the image signal processing logic 150 through the interface circuit 160. The application processor may process the image data to be displayed on a display or to be stored as an image file. The application processor may calculate a disparity by calculating a phase difference based on the phase data. The application processor may perform an auto-focusing function of a camera based on the disparity.

Figure 2:
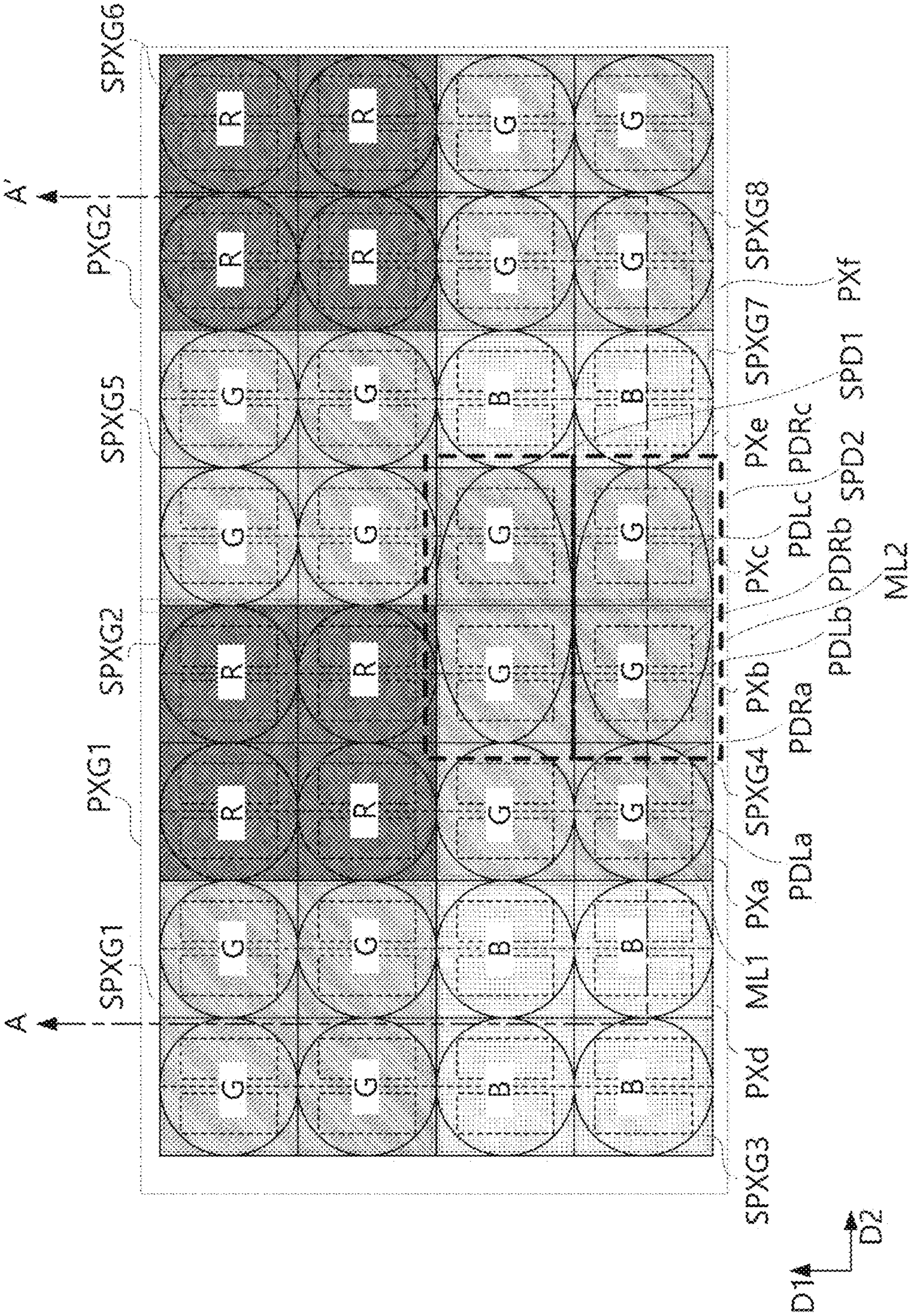
FIG. 2 illustrates a pixel array according to an embodiment.

FIG. 2 illustrates a portion of a pixel array according to an embodiment.

Referring to FIG. 2, a pixel array 110_2 according to an embodiment may include a plurality of pixel groups PXG1 and PXG2. Two pixel groups PXG1 and PXG2 are illustrated in FIG. 2 as an example, but the pixel array 110_2 may further include pixel groups in addition to the pixel groups PXG1 and PXG2. Some of the pixel groups further included may have the same pixel layout as the pixel groups PXG1 and PXG2 or may have a pixel layout similar to one of pixel layouts of embodiments to be described with reference to FIGS. 11 to 14. The pixel array 110_2 illustrated in FIG. 2 will be described with reference to the pixel groups PXG1 and PXG2.

The pixel array 110_2 will be described as including a color filter of a Bayer pattern. However, embodiments are not limited to the color filter of the Bayer pattern. For example, various color filter structures such as RGBW, RYB, and CMYG may be included.

For example, each of the pixel groups PXG1 and PXG2 may include a plurality of sub-pixel groups. For example, the pixel group PXG1 may include four sub-pixel groups SPXG1, SPXG2, SPXG3, and SPXG4, and the pixel group PXG2 may include four sub-pixel groups SPXG5, SPXG6, SPXG7, and SPXG8.

Each of the sub-pixel groups SPXG1, . . . , SPXG8 includes a plurality of pixels arranged in an M by N matrix (M and N being natural numbers). For example, referring to FIG. 2, in each of the sub-pixel groups SPXG1, . . . , SPXG8, two pixels may be disposed adjacent to each other in a first direction D1, and two pixels may be disposed adjacent to each other in a second direction D2. In other embodiments, in each sub-pixel group, three or more pixels may be disposed adjacent to each other in the first direction D1, and three or more pixels may be disposed adjacent to each other in the second direction D2.

According to an embodiment, one of the plurality of sub-pixel groups SPXG1, . . . , SPXG8 may include at least one of pixels constituting a super photodiode pixel. For example, the sub-pixel group SPXG4 among the sub-pixel groups SPXG1, SPXG2, SPXG3, and SPXG4 constituting the pixel group PXG1 may include two pixels belonging to the super photodiode pixels SPD1 and SPD2, that is, one of pixels constituting the super photodiode pixel SPD1 and one of pixels constituting the super photodiode pixel SPD2. Also, the sub-pixel group SPXG7 among the sub-pixel groups SPXG5, SPXG6, SPXG7, and SPXG8 constituting the pixel group PXG2 may include two pixels belonging to the super photodiode pixels SPD1 and SPD2. That is, the sub-pixel group SPXG4 and the sub-pixel group SPXG7 share two super photodiode pixels SPD1 and SPD2. The sub-pixel group SPXG4 and the sub-pixel group SPXG7 are respectively included in different pixel groups PXG1 and PGX2.

Pixels constituting the same single super photodiode pixel may be respectively disposed in different pixel groups. The pixel groups in which the pixels constituting the same single super photodiode pixel are disposed may be adjacent to each other. For example, two pixels constituting the super photodiode pixel SPD1 may be respectively disposed in the pixel group PXG1 and the pixel group PXG2. Two pixels PXb and PXc constituting the super photodiode pixel SPD2 may be respectively disposed in the pixel group PXG1 and the pixel group PXG2. The pixel groups PXG1 and PXG2 where the pixels constituting the super photodiode pixel SPD1 or the super photodiode pixel SPD2 are disposed may be adjacent to each other. As in the above description, pixels constituting a super photodiode pixel may be respectively disposed in different sub-pixel groups. The different sub-pixel groups may be disposed adjacent to each other and may be included in different pixel groups.

FIG. 2 illustrates an example in which two pixel groups PXG1 and PXG2 of the pixel array 110_2 share the super photodiode pixels SPD1 and SPD2. However, the above description does not mean that the sharing of the super photodiode pixel is made in all the pixel groups of the pixel array 110_2. According to an embodiment, the sharing of the super photodiode pixel may be made in all the pixel groups of the pixel array 110_2, or the sharing of the super photodiode pixel may be made in some pixel groups. That is, any pixel group may not include a pixel belonging to a super photodiode pixel. For example, pixels of one or more pixel groups may be composed entirely of dual photodiode pixels.

A sub-pixel group, in which a super photodiode pixel is not disposed (i.e., a sub-pixel group including pixels composed entirely of dual photodiode pixels), from among a plurality of sub-pixel groups constituting a pixel group may include a color filter for transmitting a light of a relevant wavelength band. For example, the pixels constituting the super photodiode pixels SPD1 and SPD2 are not disposed in the sub-pixel groups SPXG1, SPXG2, and SPXG3 of the pixel group PXG1. The sub-pixel group SPXG1 may include a green color filter "G", the sub-pixel group SPXG2 may include a red color filter "R", and the sub-pixel group SPXG3 may include a blue color filter "B". In the pixel group PXG2, the sub-pixel group SPXG5 may include the green color filter "G", the sub-pixel group SPXG6 may include the red color filter "R", and the sub-pixel group SPXG8 may include the green color filter "G".

A sub-pixel group, in which a super photodiode pixel is disposed, from among a plurality of sub-pixel groups constituting a pixel group may include a color filter for transmitting a light of a relevant wavelength band or may include color filters for transmitting lights of a plurality of wavelength bands. For example, the sub-pixel group SPXG4 of the pixel group PXG1 may only include the green color filter "G". The sub-pixel group SPXG7 of the pixel group PXG2 may include the green color filter "G" and the blue color filter "B".

Accordingly, sub-pixel groups which include pixels constituting the same super photodiode pixel are disposed and are adjacent to each other may be different in the number of pixels including the same color filter. For example, in the pixel array 110_2, the sub-pixel group SPXG4 among the sub-pixel groups SPXG4 and SPXG7 in which pixels constituting the super photodiode pixels SPD1 and SPD2 are disposed may include four pixels each including the green color filter "G". In contrast, the sub-pixel group SPXG7 may include two pixels each including the green color filter "G" and two pixels each including the blue color filter "B".

In this regard, color filters of sub-pixel groups, in which the super photodiode pixel is not disposed, from among sub-pixel groups constituting a pixel group may be disposed based on the Bayer pattern. In contrast, the number of pixels according to the Bayer pattern, which are included in a sub-pixel group in which the super photodiode pixel is disposed, may be different from that of the remaining sub-pixel groups. For example, according to the Bayer pattern, the sub-pixel group SPXG7 should include four pixels each including the blue color filter "B"; however, as the super photodiode pixels SPD1 and SPD2 are disposed, the number of pixels of the sub-pixel group SPXG7, each of which includes the blue color filter "B", may not be "4".

Each of pixels constituting a super photodiode pixel according to an embodiment may include a color filter for transmitting a light of the same wavelength band. That is, the pixels constituting the super photodiode pixel may include the same color filters.

For example, referring to FIG. 2, the plurality of pixel groups PXG1 and PXG2 include two super photodiode pixels SPD1 and SPD2. The pixels constituting the super photodiode pixel SPD1 include the same green color filters "G", respectively. The pixels PXb and PXc constituting the super photodiode pixel SPD2 include the same green color filters "G", respectively.

Pixels constituting a super photodiode pixel according to an embodiment may be disposed adjacent to each other in a direction that is the same as a direction in which photoelectric conversion elements are disposed adjacent to each other. For example, a plurality of photoelectric conversion elements included in each pixel of FIG. 2 may be disposed adjacent to each other in the second direction D2. Also, the pixels PXb and PXc constituting the super photodiode pixel SPD2 are disposed adjacent to each other in the second direction D2. The pixels constituting the super photodiode pixel SPD1 are disposed in the same manner as described.

Dual photodiode pixels adjacent to a super photodiode pixel may include different color filters. The dual photodiode pixels may be disposed adjacent to the super photodiode pixel in a direction in which pixels of the super photodiode pixel are adjacent to each other. For example, the pixels PXb and PXc constituting the super photodiode pixel SPD2 are disposed adjacent to each other in the second direction D2. Dual photodiode pixels PXa and PXd are disposed adjacent to the super photodiode pixel SPD2 in the second direction D2. The dual photodiode pixels PXa and PXd include color filters for transmitting lights of different wavelength bands. For example, as shown in FIG. 2, the pixel PXa includes the green color filter "G", and the pixel PXd includes the blue color filter "B".

Figure 3:
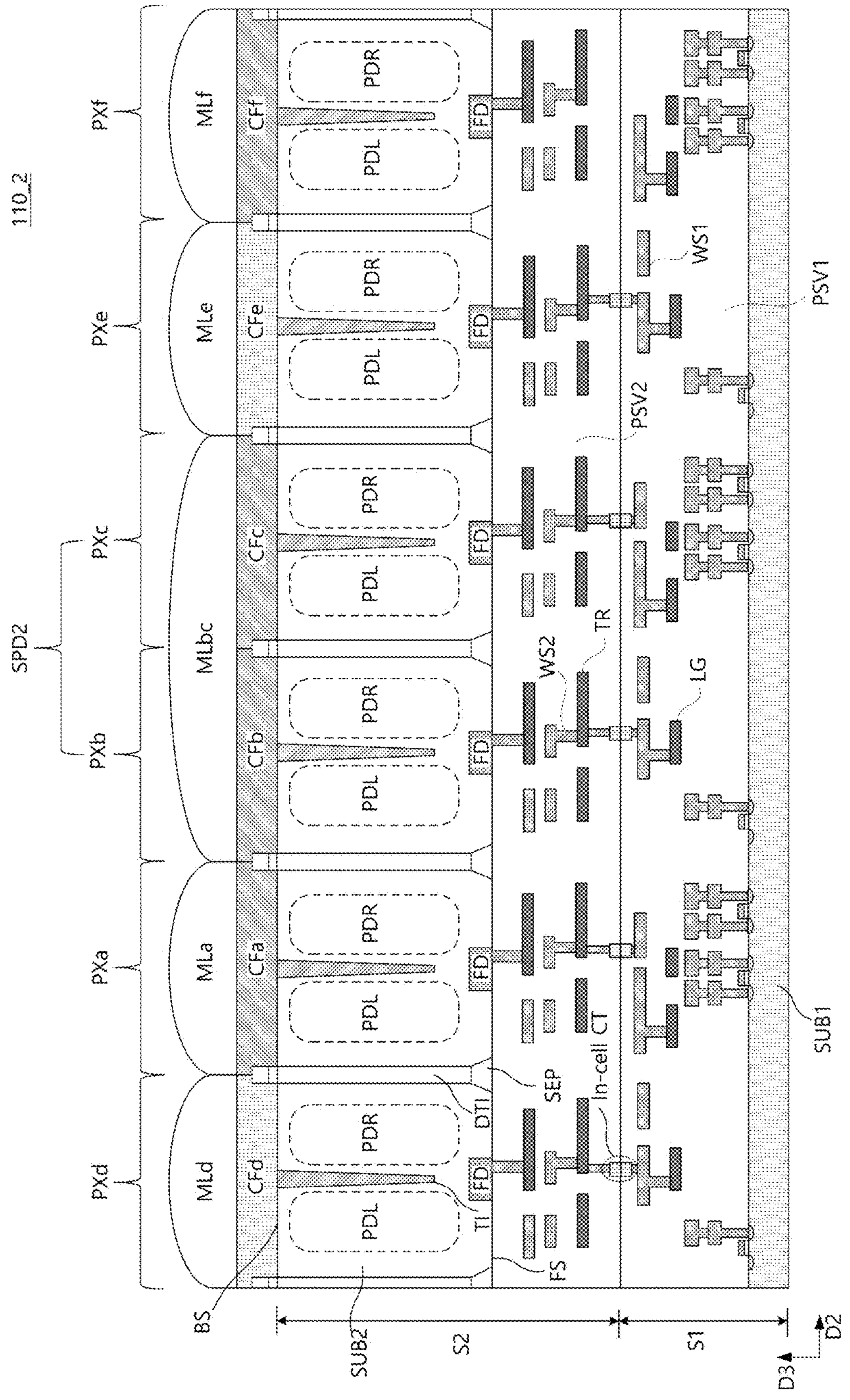
FIG. 3 is a cross-sectional view of a pixel array according to an embodiment.

FIG. 3 illustrates a portion corresponding to pixels PXa, PXb, PXc, PXd, PXe, and PXf from among a vertical cross-section of the pixel array 110_2 of FIG. 2, which is taken along line A-A'.

The pixel array 110_2 according to an embodiment may include a first chip S1 and a second chip S2.

The first chip S1 may include a first substrate SUB1, circuit elements LG, a first wiring structure WS1, and a first insulating layer PSV1. The first substrate SUB1 may be a semiconductor substrate. The circuit elements LG may include circuit transistors each including a gate electrode layer, a gate insulating layer, and source/drain regions. The circuit elements LG may constitute a logic circuit. Some of the circuit elements LG may be used to implement at least one of the row driver 120, the timing controller 130, the readout circuit 140, the image signal processing logic 150, and the interface circuit 160 described with reference to FIG. 1.

For example, the image signal processing logic 150 may be formed in the first chip S1. The image signal processing logic 150 may output image data and phase data based on pixel signals of the pixels PXa, PXb, PXc, PXd, PXe, and PXf of the second chip S2.

The second chip S2 may be stacked on the first chip S1 and may be electrically connected to the first chip S1. In an embodiment, the first chip S1 and the second chip S2 may be electrically connected through an in-cell contact inside the pixel array 110_2. The in-cell contact may be, for example, a Cu-to-Cu bonding contact. According to an embodiment, the first chip S1 and the second chip S2 may be electrically connected through pads and through silicon vias (TSV) provided in an area outside the pixel array 110_2, which will be described with reference to FIG. 16.

The second chip S2 may include a second substrate SUB2, a second wiring structure WS2, circuit elements TR, and a second insulating layer PSV2.

The second substrate SUB2 may be a semiconductor substrate. The second substrate SUB2 may include a first surface FS and a second surface BS opposite to each other (or facing away from each other). The first surface FS may be a front surface of the second substrate SUB2, and the second surface BS may be a back surface of the second substrate SUB2. For example, the image sensor 100 may be a backside illumination type (BSI) CMOS image sensor in which a light is incident onto the back surface of the second substrate SUB2.

The circuit elements TR may provide a control signal to each of the pixels PXa, PXb, PXc, PXd, PXe, and PXf or may transfer an output of each of the pixels PXa, PXb, PXc, PXd, PXe, and PXf to the first chip S1. For example, the circuit elements TR may include at least some of transfer transistors LTX and RTX, a reset transistor RX, a drive transistor DX, and a select transistor SX, which will be described with reference to FIG. 4.

In an embodiment, in response to control signals of the row driver 120 and the timing controller 130 disposed in the first chip S1 or the second chip S2, the circuit elements TR may allow the pixels PXa, PXb, PXc, PXd, PXe, and PXf to operate differently depending on a plurality of autofocus modes. For example, in the first autofocus mode, the plurality of photoelectric conversion elements PDL and PDR may be controlled to transfer photoelectrons to a floating diffusion region FD in different readout time periods. In the second autofocus mode, the plurality of photoelectric conversion elements PDL and PDR may be controlled to simultaneously transfer photoelectrons to the floating diffusion region FD in the same readout time period.

The pixels PXa, PXb, PXc, PXd, PXe, and PXf of the pixel array 110_2 may be formed in the second chip S2.

A plurality of pixel isolation layers DTI that extend from the second surface BS to the first surface FS may be formed in the second substrate SUB2. The pixels PXa, PXb, PXc, PXd, PXe, and PXf may be separated from each other by the pixel isolation layers DTI.

Selectively, a plurality of element separation parts SEP that are extended from the first surface FS to the second surface BS as much as a given depth may be formed in the second substrate SUB2. The element separation parts SEP may include an insulating material.

The pixel array 110_2 according to an embodiment may include the pixels PXb and PXc constituting the super photodiode pixel SPD2 and the plurality of dual photodiode pixels PXa, PXd, PXe, and PXf.

Each of the pixels PXa, PXb, PXc, PXd, PXe, and PXf includes the plurality of photoelectric conversion elements PDL and PDR. Areas in which the plurality of photoelectric conversion elements PDL and PDR are formed may be separated from each other by the plurality of device isolation layers TI extending from the second surface BS of the second substrate SUB2 to the first surface FS of the second substrate SUB2. The plurality of photoelectric conversion elements PDL and PDR of each of the pixels PXa, PXb, PXc, PXd, PXe, and PXf may share one floating diffusion region FD for each pixel.

The plurality of pixels PXb and PXc constituting the super photodiode pixel SPD2 share the same single micro lens MLbc. Accordingly, at least four photoelectric conversion elements of the plurality of pixels PXb and PXc may share the same single micro lens MLbc. Each of the plurality of pixels PXb and PXc constituting the super photodiode pixel SPD2 may include a color filter for transmitting a light of the same wavelength band. For example, color filters CFb and CFc may be color filters for transmitting a light of the same wavelength band.

The dual photodiode pixels PXa, PXd, PXe, and PXf respectively include micro lenses MLa, MLd, MLe, and MLf and respectively include color filters CFa, CFd, CFe, and CFf.

The plurality of photoelectric conversion elements PDL and PDR of each of the pixels PXa, PXb, PXc, PXd, PXe, and PXf are disposed adjacent to each other in the second direction D2. The dual photodiode pixels PXa and PXe adjacent to the super photodiode pixel SPD2 in the second direction D2 may respectively include color filters for transmitting light of different wavelength bands. For example, the color filters CFa and CFe may be different color filters for transmitting lights of different wavelength bands.

In an embodiment, depending on autofocus modes, the image signal processing logic 150 of the first chip S1 may output phase data based on pixel signals from the super photodiode pixel SPD2 of the second chip S2 or may output phase data based on pixel signals from the dual photodiode pixels PXa, PXd, PXe, and PXf.

Figure 4:
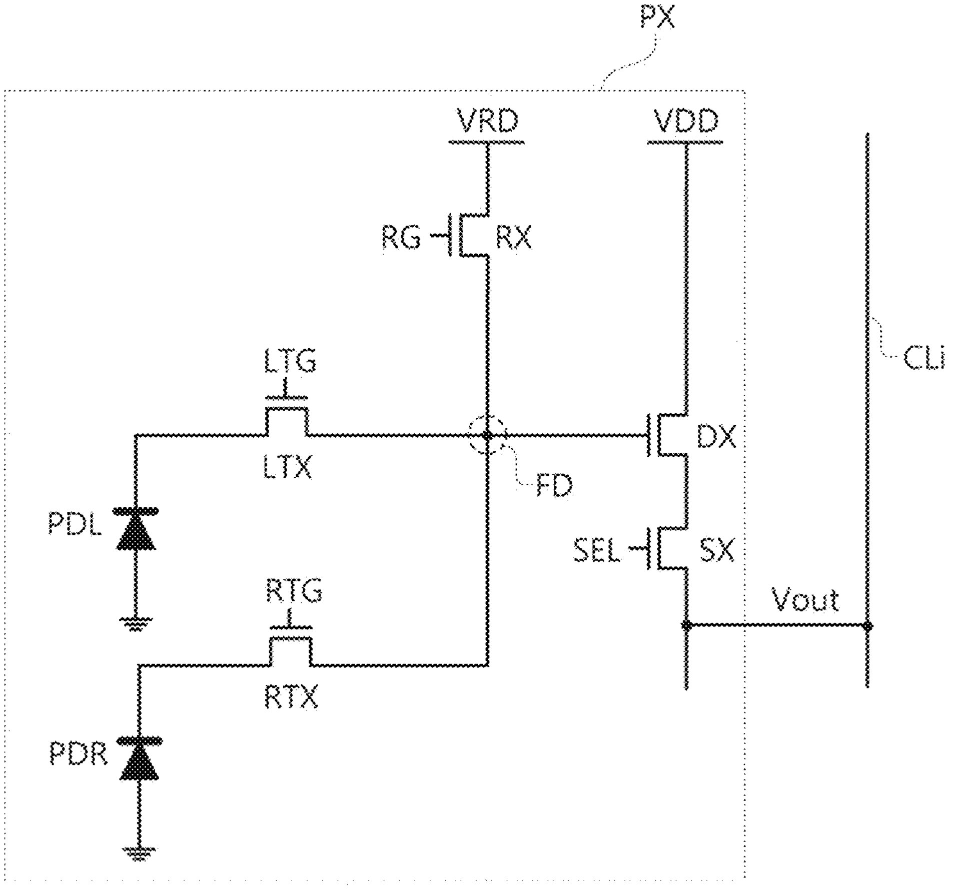
FIG. 4 is a circuit diagram of a pixel according to an embodiment.

FIG. 4 illustrates a circuit configuration of a pixel of the pixel array 110_2. The pixel PX of FIG. 4 may correspond to one of the pixels PXa, PXb, PXc, PXd, PXe, and PXf of FIG. 2.

Referring to FIG. 4, the pixel PX may include the plurality of photoelectric conversion elements PDL and PDR, the plurality of transfer transistors LTX and RTX, the floating diffusion region FD, the reset transistor RX, the drive transistor DX, and the select transistor SX.

The transfer transistor LTX electrically connects the first photoelectric conversion element PDL to the floating diffusion region FD, and the transfer transistor RTX electrically connects the second photoelectric conversion element PDR to the floating diffusion region FD.

The transfer transistors LTX and RTX according to an embodiment differently operate depending on autofocus modes. Control signals LTG and RTG respectively controlling the transfer transistors LTX and RTX transition to the high level or the low level in different time periods.

For example, in the first autofocus mode, the transfer transistors LTX and RTX may be respectively turned on in different readout time periods. In the second autofocus mode, the transfer transistors LTX and RTX may be simultaneously turned on in the same readout time period. This will be described in detail with reference to FIGS. 5 to 7.

The reset transistor RX electrically connects the floating diffusion region FD and a reset voltage VRD. The reset voltage VRD may be the same as or different from a pixel voltage VDD.

The pixel voltage VDD is used to drive the drive transistor DX. The drive transistor DX outputs an output voltage Vout corresponding to a potential formed at the floating diffusion region FD. The drive transistor DX outputs the output voltage Vout to a column line CLi through the select transistor SX.

FIGS. 5A to 7B illustrate operations of a pixel of the pixel array 110_2 according to FIG. 2. FIGS. 5A to 7B will be described with reference to the super photodiode pixel SPD2 and the dual photodiode pixels PXa and PXe adjacent to the super photodiode pixel SPD2. In FIGS. 5A to 7B, each pixel may be expressed by a circuit according to FIG. 4. FIGS. 5A to 7B will be described under the condition that the first photoelectric conversion element PDL and the second photoelectric conversion element PDR of each of the pixels PXa, PXb, PXc, and PXe are sequentially disposed in the second direction D2.

FIGS. 5A to 6B describe a pixel driving method in the first autofocus mode in which phase data are provided based on the dual photodiode pixels PXa and PXe. FIGS. 7A and 7B describe a pixel driving method in the second autofocus mode in which phase data are provided based on the super photodiode pixel SPD2.

Figure 5A:
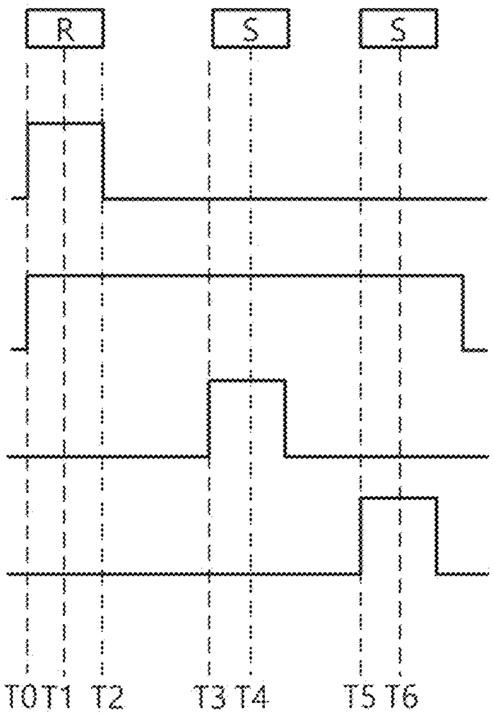
FIGS. 5A and 5B are diagrams describing an operation of an image sensor according to an embodiment.
Figure 5B:
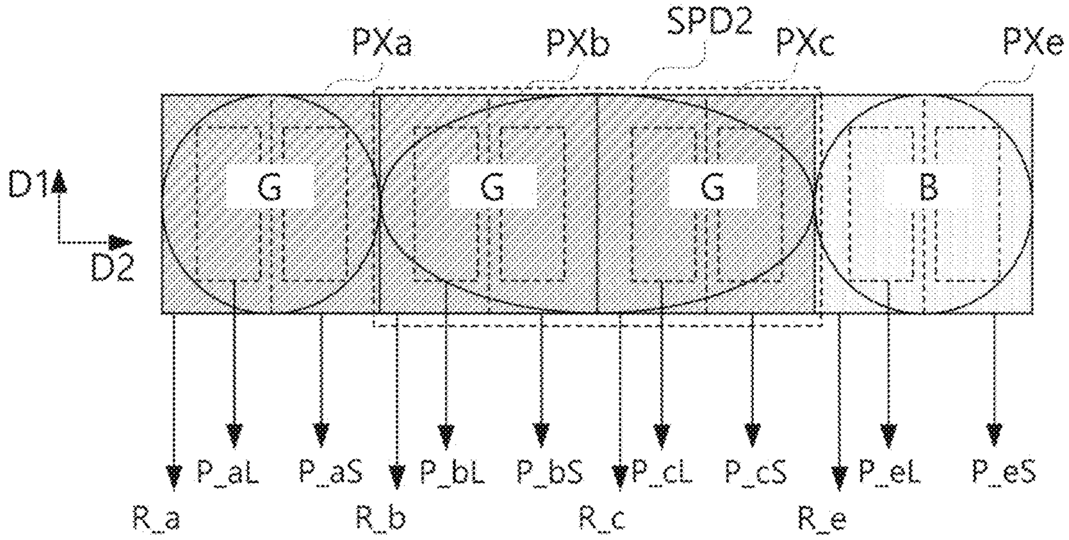

FIGS. 5A and 5B describe a pixel driving method according to an embodiment of the first autofocus mode.

Referring to FIGS. 5A and 5B, at T0, a reset signal RG and a selection signal SEL that are provided to the pixels PXb and PXc of the super photodiode pixel SPD2 and the dual photodiode pixels PXa and PXe are at the high level. Thus, the reset voltage VRD is provided to the floating diffusion region FD through the reset transistor RX. The floating diffusion region FD is reset by the reset voltage level that the reset voltage VRD provides.

In the pixel driving method according to an embodiment, at T1, reset level signals R_a, R_b, R_c, and R_e of the pixels PXa, PXb, PXc, and PXe are sampled. Afterwards, at T2, the reset signal RG transitions to the low level.

At T3, in each of the pixels PXa, PXb, PXc, and PXe, the transfer transistor LTX that connects the first photoelectric conversion element PDL and the floating diffusion region FD is turned on. In each of the pixels PXa, PXb, PXc, and PXe, photoelectrons accumulated by the first photoelectric conversion element PDL are transferred to the floating diffusion region FD.

At T4, pixel level signals P_aL, P_bL, P_cL, and P_eL respectively corresponding to potentials of the floating diffusion regions FD of the respective pixels PXa, PXb, PXc, and PXe are output to the column lines CLi. Afterwards, the transfer transistor LTX of each of the pixels PXa, PXb, PXc, and PXe is turned off.

At T5, in each of the pixels PXa, PXb, PXc, and PXe, the transfer transistor RTX that connects the second photoelectric conversion element PDR and the floating diffusion region FD is turned on. In each of the pixels PXa, PXb, PXc, and PXe, photoelectrons accumulated by the second photoelectric conversion element PDR are transferred to the floating diffusion region FD.

At T6, pixel level signals P_aS, P_bS, P_cS, and P_eS respectively corresponding to potentials of the floating diffusion regions FD of the respective pixels PXa, PXb, PXc, and PXe are output to the column lines CLi. Each of the pixel level signals P_aS, P_bS, P_cS, and P_eS is a pixel level signal corresponding to a sum of photoelectrons of the first photoelectric conversion element PDL and the photoelectrons of the second photoelectric conversion element PDR. Afterwards, the transfer transistor RTX of each of the pixels PXa, PXb, PXc, and PXe is turned off.

The readout circuit 140 outputs pixel data based on the pixel level signals P_aS, P_bS, P_cS, and P_eS and the reset level signals R_a, R_b, R_c, and R_e.

The image signal processing logic 150 may generate pieces of pixel data based on the second photoelectric conversion elements PDR by subtracting values of pieces of pixel data based on the pixel level signals P_aL and P_eL of the first photoelectric conversion elements PDL from pieces of pixel data based on the pixel level signals P_aS and P_eS. The image signal processing logic 150 may output phase data by using the pieces of pixel data based on the first photoelectric conversion elements PDL and the pieces of pixel data based on the second photoelectric conversion elements PDR.

The image signal processing logic 150 according to an embodiment may output the phase data by using pieces of pixel data respectively corresponding to photoelectric conversion elements of dual photodiode pixels. Accordingly, the image sensor 100 may provide accurate phase data.

Figure 6A:
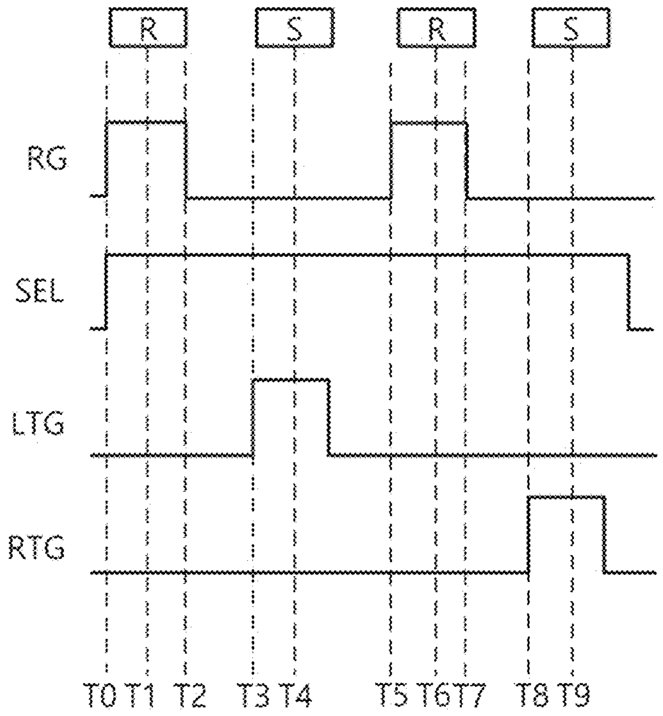
FIGS. 6A and 6B are diagrams describing an operation of an image sensor according to an embodiment.
Figure 6B:
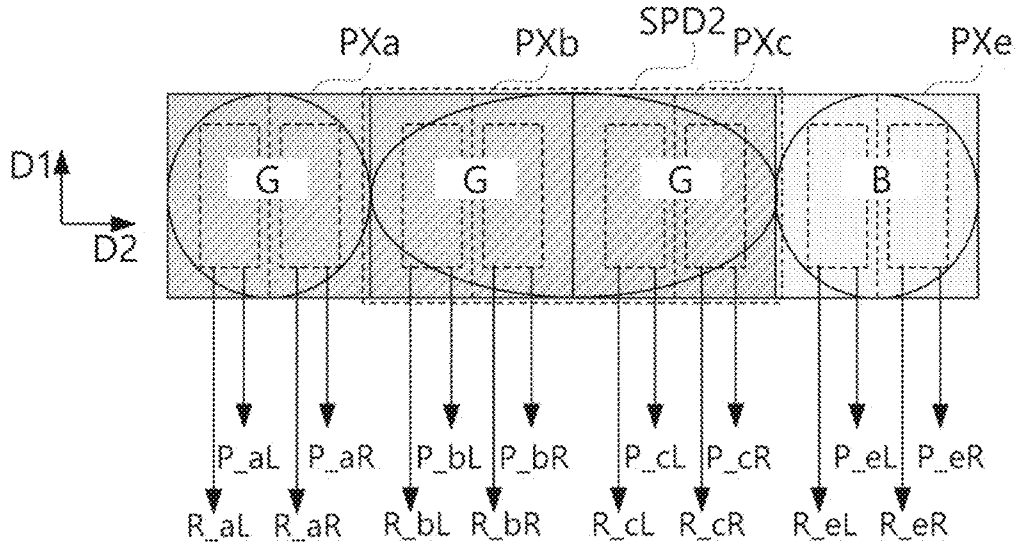
Figure 7A:
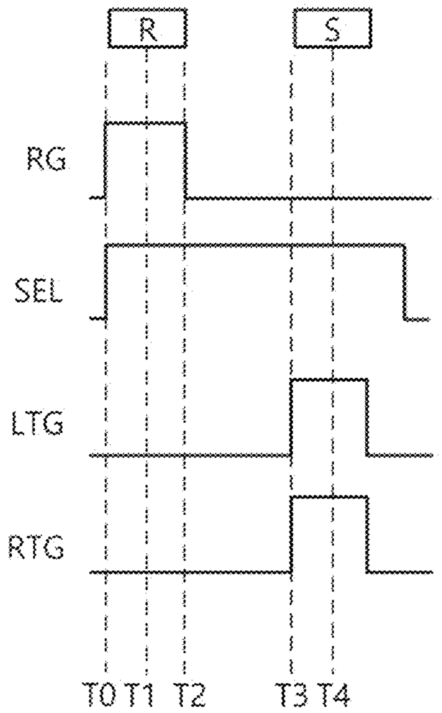
FIGS. 7A and 7B are diagrams describing an operation of an image sensor according to an embodiment.
Figure 7B:
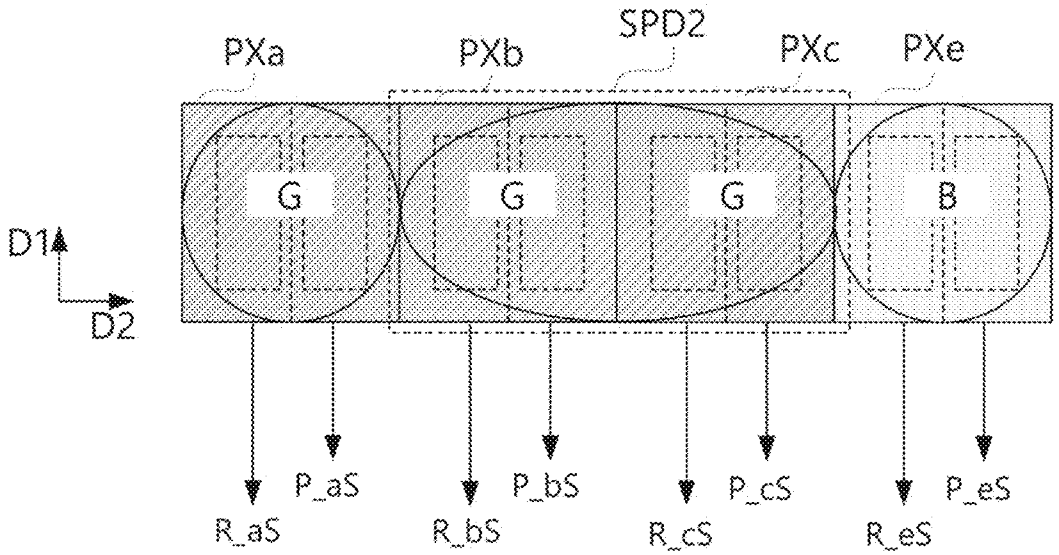

FIGS. 6A and 6B describe a pixel driving method according to another embodiment of the first autofocus mode. Additional description that is the same as the description given with reference to FIGS. 5A and 5B will be omitted to avoid redundancy.

In contrast to FIGS. 5A and 5B, referring to FIGS. 6A and 6B, in a driving method of an image sensor according to an embodiment, pixel level signals P_aL, P_aR, P_bL, P_bR, P_cL, P_CR, P_eL, and P_eR of the photoelectric conversion elements PDL and PDR of the pixels PXa, PXb, PXc, and PXe are individually sampled. As such, reset level signals R_aL, R_aR, R_bL, R_bR, R_CL, R_cR, R_eL, and R_eR are individually sampled.

At T0, the reset transistor RX is turned on such that the floating diffusion region FD is reset; at T1, the reset level signals R_aL, R_bL, R_cL, and R_eL of the floating diffusion regions FD of the pixels PXa, PXb, PXc, and PXe are sampled.

Afterwards, at T3, the transfer transistors LTX are turned on, and thus, photoelectrons of the first photoelectric conversion elements PDL of the pixels PXa, PXb, PXc, and PXe are transferred to the corresponding floating diffusion regions FD. At T4, the pixel level signals P_aL, P_bL, P_cL, and P_eL of the photoelectric conversion elements PDL of the pixels PXa, PXb, PXc, and PXe are sampled.

At T5, the floating diffusion regions FD are again reset, and the reset level signals R_aR, R_bR, R_cR, R_eR of the floating diffusion regions FD of the pixels PXa, PXb, PXc, and PXe are then sampled. Afterwards, at T8, the transfer transistors RTX are turned on; at T9, photoelectrons of the second photoelectric conversion elements PDR of the pixels PXa, PXb, PXc, and PXe are sampled.

The readout circuit 140 outputs pixel data based on the pixel level signals P_aL, P_aR, P_bL, P_bR, P_cL, P_CR, P_eL, and P_eR and the reset level signals R_aL, R_aR, R_bL, R_bR, R_CL, R_cR, R_eL, and R_eR.

The image signal processing logic 150 may output phase data by using the pieces of pixel data based on the first photoelectric conversion element PDL and the second photoelectric conversion element PDR of each of the dual photodiode pixels PXa and PXe.

Accordingly, the image signal processing logic 150 of FIGS. 6A and 6B may output phase data by using pieces of pixel data based on photoelectric conversion elements of each of the dual photodiode pixels PXa and PXe. The image signal processing logic 150 may output phase data without using pixel data of the pixels PXb and PXc constituting the super photodiode pixel SPD2.

FIGS. 7A and 7B describe a pixel driving method according to an embodiment of the second autofocus mode. Additional description that is the same as the description given with reference to FIGS. 5A to 6B will be omitted to avoid redundancy.

Unlike FIGS. 5A to 6B, referring to FIGS. 7A and 7B, in a driving method of an image sensor according to an embodiment, pixel level signals P_aS, P_bS, P_cS, and P_eS of the pixels PXa, PXb, PXc, and PXe are sampled for each pixel. As such, reset level signals R_aS, R_bS, R_cS, and R_eS of the pixels PXa, PXb, PXc, and PXe are sampled for each pixel.

At T0, in each of the pixels PXa, PXb, PXc, PXe, the floating diffusion region FD is reset by the reset voltage VRD. At T1, the reset level signals R_aS, R_bS, R_cS, and R_eS of the floating diffusion regions FD of the pixels PXa, PXb, PXc, and PXe are sampled.

Afterwards, at T3, in each of the pixels PXa, PXb, PXc, and PXe, the transfer transistors LTX and RTX respectively connected to the photoelectric conversion elements PDL and PDR are simultaneously turned on. In each of the pixels PXa, PXb, PXc, and PXe, photoelectrons of the first photoelectric conversion element PDL and the second photoelectric conversion element PDR are simultaneously transferred to the floating diffusion region FD. At T4, the pixel level signals P_aS, P_bS, P_cS, and P_eS of the pixels PXa, PXb, PXc, and PXe are sampled.

The readout circuit 140 may output pixel data by using the pixel level signals P_bS and P_cS and the reset level signals R_bS and R_cS of the pixels PXb and PXc constituting the super photodiode pixel SPD2.

The image signal processing logic 150 may output phase data by using pieces of pixel data of the pixels PXb and PXc constituting the super photodiode pixel SPD2. The phase data may be output based on pixel data for each pixel, not pixel data for each photodiode. Also, the image signal processing logic 150 may output phase data without using pixel data of the dual photodiode pixels PXa and PXe. Accordingly, the auto focusing may be performed at high speed. Also, image data may also be generated based on a pixel level signal and a reset level signal sampled for each pixel. Accordingly, a frame rate of a photographed image may be improved even while performing the auto focusing.

Figure 8:
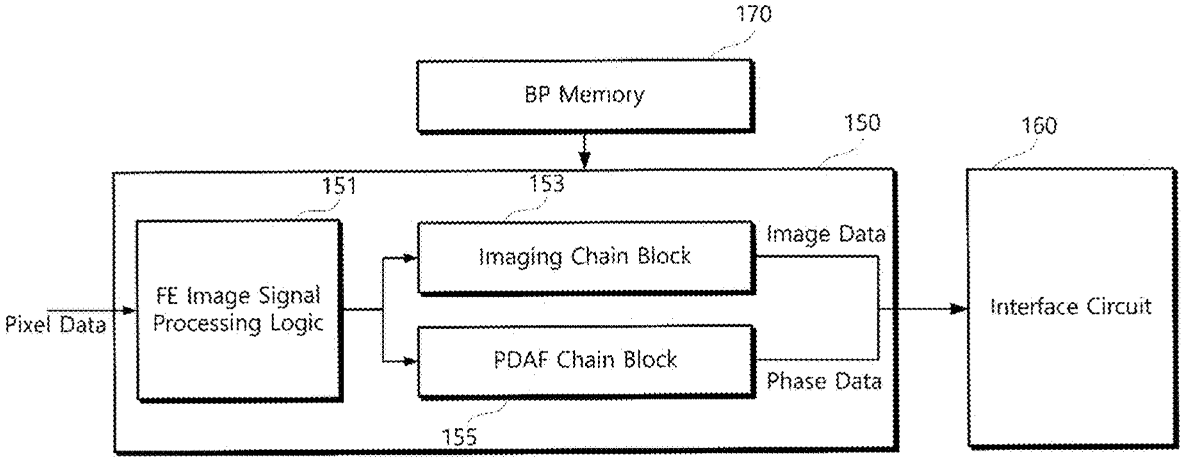
FIG. 8 is a block diagram describing image signal processing logic according to an embodiment.

FIG. 8 is a block diagram describing image signal processing logic according to an embodiment. Image signal processing logic to be described with reference to FIG. 8 may be the image signal processing logic 150 of FIG. 1. Referring to FIG. 8, the image signal processing logic 150 may include front end image signal processing logic 151, an imaging chain block 153, and a phase detection autofocus (PDAF) chain block 155.

The front end image signal processing logic 151 is provided with pixel data. The front end image signal processing logic 151 may perform pre-processing with respect to the pixel data so as to be suitable for the pixel data processing format of the imaging chain block 153 and the PDAF chain block 155, and the pre-processing may include crosstalk correction, auto dark level compensation (ADLC), digital gain processing, etc.

The imaging chain block 153 process the pre-processed pixel data to generate image data.

The imaging chain block 153 according to an embodiment may generate image data by performing bad pixel correction (BPC) processing with respect to pixel data corresponding to a super photodiode pixel from among pixel data. In both the first autofocus mode based on a dual photodiode pixel and the second autofocus mode based on a super photodiode pixel, the imaging chain block 153 may generate image data by performing the BPC processing with respect to pixel data associated with a super photodiode pixel.

The imaging chain block 153 may refer to an BP memory 170 for BPC processing. The BP memory 170 may be implemented with a memory device, such as a dynamic random access memory (DRAM), a static random-access memory (SRAM), an erasable programmable ROM (EPROM), an electrically erasable programmable ROM (EEPROM), a resistive memory, a one-time programmable (OTP) memory, a flash memory, or may be implemented with a register. The BP memory 170 may store information about coordinates of bad pixels detected in the process of testing an image sensor and coordinates of pixels constituting a super photodiode pixel. According to an embodiment, information about coordinates of the pixels constituting the super photodiode pixel may be stored in a storage space different from a storage space where the information about coordinates of the bad pixels are stored.

Referring to FIGS. 5B and 8 together, the imaging chain block 153 may perform the BPC processing with respect to pixel data of the pixels PXb and PXc constituting the super photodiode pixel SPD2.

The imaging chain block 153 may correct the pixel data of the pixels PXb and PXc based on pixel data of neighboring pixels of the pixels PXb and PXc. For example, the BPC processing may be performed based on an average value of pieces of pixel data of pixels, each of which includes the same color filter as the pixels PXb and PXc, from among the neighboring pixels. Alternatively, the BPC processing may be performed with respect to the pixel data based on various filtering manners such as a median filtering manner and a weighted filtering manner. In addition, various BPC processing methods that are well known in the art may be used.

As in the above description, the imaging chain block 153 may also perform the BPC processing with respect to the pixels PXb and PXc constituting the super photodiode pixel SPD2 of FIG. 6B and the pixels PXb and PXc constituting the super photodiode pixel SPD2 of FIG. 7B. Accordingly, the imaging chain block 153 may perform the BPC processing with respect to pixel data based on a super photodiode pixel, in both the first autofocus mode and the second autofocus mode.

The imaging chain block 153 may generate image data based on pixel data for each pixel.

For example, referring to FIG. 5B, the imaging chain block 153 may generate image data based on pieces of pixel data based on the pixel level signals P_aS and PeS of the dual photodiode pixels PXa and PXe and pieces of pixel data obtained by performing the BPC processing with respect to the pixels PXb and PXc. Also, referring to FIG. 6B, the imaging chain block 153 may calculate pixel data of the pixel PXa based on a sum of pieces of pixel data based on the pixel level signals P_aL and P_aR. Likewise, the imaging chain block 153 may calculate pixel data of the pixel PXe based on a sum of pieces of pixel data based on the pixel level signals P_eL and P_eR. The imaging chain block 153 may generate image data based on the pieces of pixel data of the pixels PXa and PXe and the pieces of pixel data obtained by performing the BPC processing with respect to the pixels PXb and PXc. Also, referring to FIG. 7B, the imaging chain block 153 may generate image data based on pieces of pixel data based on the pixel level signals P_aS and PeS of the pixels PXa and PXe and pieces of pixel data obtained by performing the BPC processing with respect to the pixels PXb and PXc.

The PDAF chain block 155 according to an embodiment may generate phase data by differently processing the pre-processed pixel data depending on autofocus modes.

In the first autofocus mode in which phase data are generated based on a dual photodiode pixel, the PDAF chain block 155 may generate phase data based on pixel data of a plurality of photoelectric conversion elements of a dual photodiode pixel. For example, referring to FIGS. 5B and 8 together, the PDAF chain block 155 may generate phase data based on pieces of pixel data based on the first photoelectric conversion elements PDL of the pixels PXa and PXe, and pieces of pixel data based on the second photoelectric conversion elements PDR of the pixels PXa and PXe. The application processor may calculate a disparity based on a difference between the phase data of the first photoelectric conversion element PDL and the phase data of the second photoelectric conversion element PDR. According to an embodiment, the PDAF chain block 155 may generate phase data by down-scaling pixel data of each of a plurality of photoelectric conversion elements of a dual photodiode pixel.

In the second autofocus mode in which phase data are generated based on a super photodiode pixel, the PDAF chain block 155 may generate phase data based on pixel data of a plurality of pixels of a super photodiode pixel. For example, referring to FIGS. 7B and 8 together, the PDAF chain block 155 may generate phase data based on pieces of pixel data of the pixels PXb and PXc. The application processor may calculate a disparity based on a difference between the phase data of the pixel PXb and the phase data of the pixel PXc.

According to an embodiment, in the second autofocus mode, the PDAF chain block 155 may distinguish pixel data of a plurality of pixels constituting a super photodiode pixel from pixel data pre-processed with reference to the BP memory 170. Alternatively, the front end image signal processing logic 151 may separate pixel data of pixels constituting a super photodiode pixel so as to be provided to the PDAF chain block 155. Alternatively, a timing controller may control a readout circuit such that pixel data of pixels constituting a super photodiode pixel are selected and are provided to the PDAF chain block 155.

The image signal processing logic 150 transmits the image data and the phase data to the outside of the image sensor 100 through the interface circuit 160.

Figure 9:
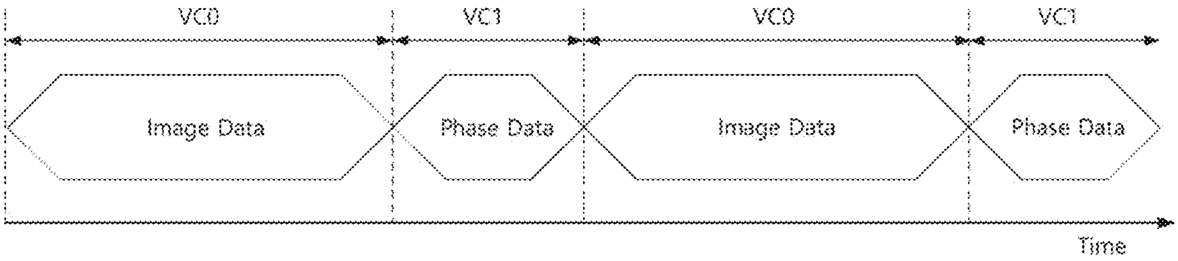
FIGS. 9 and 10 are diagrams describing an output operation of an image sensor according to an embodiment.
Figure 10:
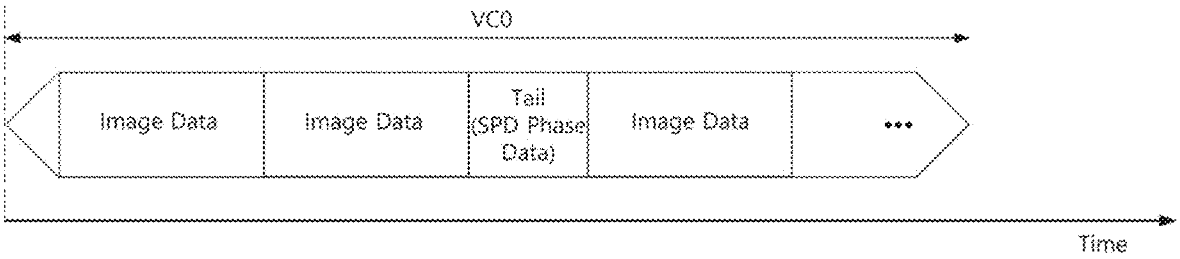

FIGS. 9 and 10 are diagrams describing an output operation of an image sensor according to an embodiment. An image sensor outputs image data and phase data. The interface circuit 160 of FIG. 1 may output image data and phase data. The interface circuit 160 may be an interface circuit that transmits data and receives a control signal. For example, the interface circuit 160 may comply with the Mobile Industry Processor Interface alliance (MIPI) standard.

The interface circuit 160 according to an embodiment may transmit image data and phase data in different methods depending on autofocus modes.

Referring to FIG. 9, in the first autofocus mode, the interface circuit 160 may transmit image data and phase data to the outside through different virtual channels. The virtual channel may be an MIPI virtual channel.

The interface circuit 160 may transmit image data through a first virtual channel VC0 and may transmit phase data through a second virtual channel VC1. Phase data may be data down-scaled based on pixel data of each of a plurality of photoelectric conversion elements of dual photodiode pixels. For example, one row of phase data may be generated based on pixel data of each of a plurality of photoelectric conversion elements of dual photodiode pixels belonging to "n" rows. Likewise, one column of phase data may be generated based on pixel data of each of a plurality of photoelectric conversion elements of dual photodiode pixels belonging to "n" columns.

The interface circuit 160 may alternately transmit image data and phase data to different virtual channels in different time periods.

Referring to FIG. 10, in the second autofocus mode, the interface circuit 160 may transmit image data and phase data to the outside through the same virtual channel The virtual channel may be an MIPI virtual channel. Phase data may be phase data based on pixel data of pixels constituting a super photodiode pixel.

The interface circuit 160 may add the phase data as a tail of the image data and may transmit the phase data to the same virtual channel as the image data. The interface circuit 160 may add a packet header and a packet footer to the image data. The interface circuit 160 may also add the packet header and the packet footer to the phase data.

Figure 11:
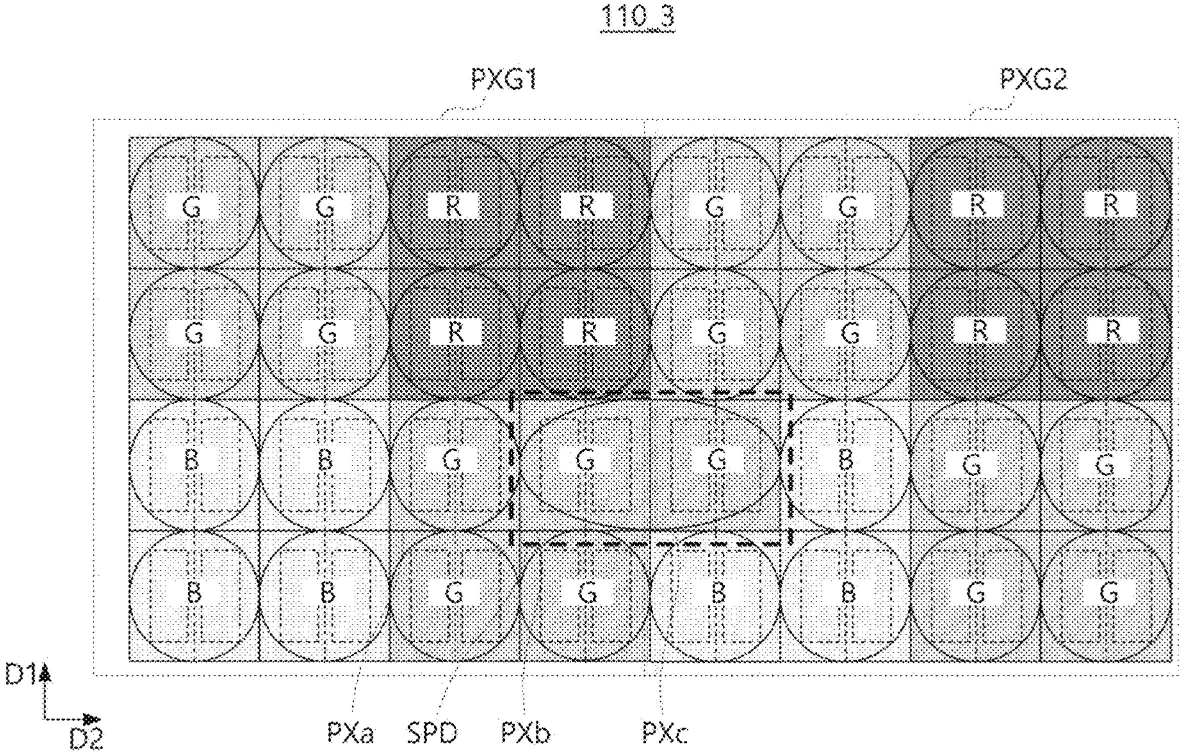
FIGS. 11 to 15 illustrate pixel arrays according to embodiments.

FIG. 11 is a diagram describing a pixel array according to another embodiment. FIG. 11 shows some pixel groups of a pixel array. Additional description that is the same as the description given with reference to the above drawings will be omitted to avoid redundancy.

Unlike the pixel array 110_2 described with reference to FIG. 2, in a pixel array 110_3 according to an embodiment, as illustrated in FIG. 11, a plurality of pixel groups PXG1 and PXG2 that are adjacent to each other share one super photodiode pixel SPD.

The pixel group PXG1 includes a pixel PXb constituting the super photodiode pixel SPD. The pixel group PXG2 includes a pixel PXc constituting the super photodiode pixel SPD.

Each of pixels of the pixel array 110_3 includes a plurality of photoelectric conversion elements.

The pixels PXb and PXc constituting the super photodiode pixel SPD are disposed adjacent to each other in a direction the same as a direction in which a plurality of photoelectric conversion elements are adjacent to each other.

The pixels PXb and PXc constituting the super photodiode pixel SPD respectively include color filters for transmitting a light of the same wavelength band.

The pixels PXb and PXc constituting the super photodiode pixel SPD share the same single micro lens. In a dual photodiode pixel (e.g., PXa), a plurality of photoelectric conversion elements share the same single micro lens.

According to an embodiment, the sharing of the super photodiode pixel may be made in all the pixel groups of the pixel array 110_3, or the sharing of the super photodiode pixel may be made in some pixel groups.

Figure 12:
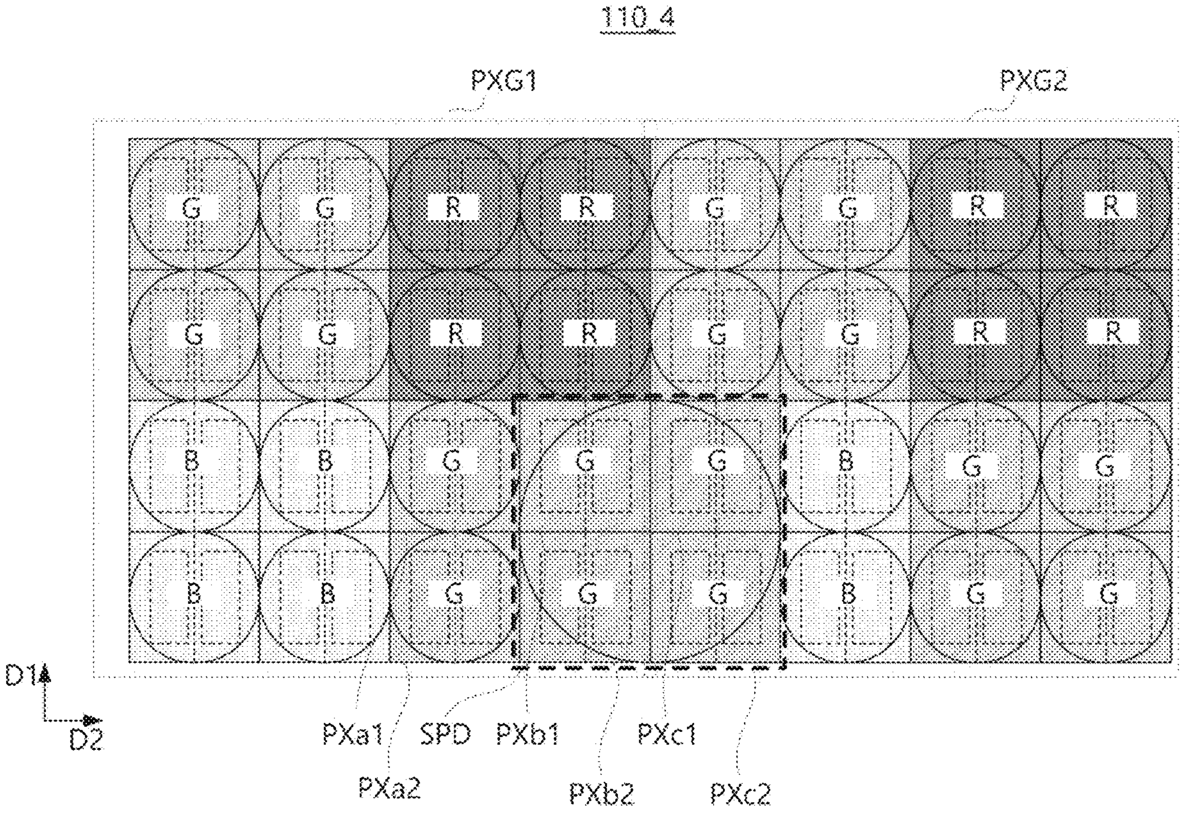

FIG. 12 is a diagram describing a pixel array according to another embodiment. FIG. 12 shows some pixel groups of a pixel array. Additional description that is the same as the description given with reference to the above drawings will be omitted to avoid redundancy.

In a pixel array 110_4 according to an embodiment, as illustrated in FIG. 12, one super photodiode pixel SPD include four pixels PXb1, PXc1, PXb2, and PXc2.

The pixels PXb1, PXc1, PXb2, and PXc2 constituting the super photodiode pixel SPD share the same single micro lens. The pixels PXb1, PXc1, PXb2, and PXc2 respectively include color filters for transmitting a light of the same wavelength band.

Some of the pixels PXb1, PXc1, PXb2, and PXc2 are disposed in a pixel group PXG1, and the others thereof are disposed in a pixel group PXG2 adjacent to the pixel group PXG1.

Each of pixels of the pixel array 110_4 includes a plurality of photoelectric conversion elements.

According to an embodiment, the sharing of the super photodiode pixel may be made in all the pixel groups of the pixel array 110_4, or the sharing of the super photodiode pixel may be made in some pixel groups.

Figure 13:
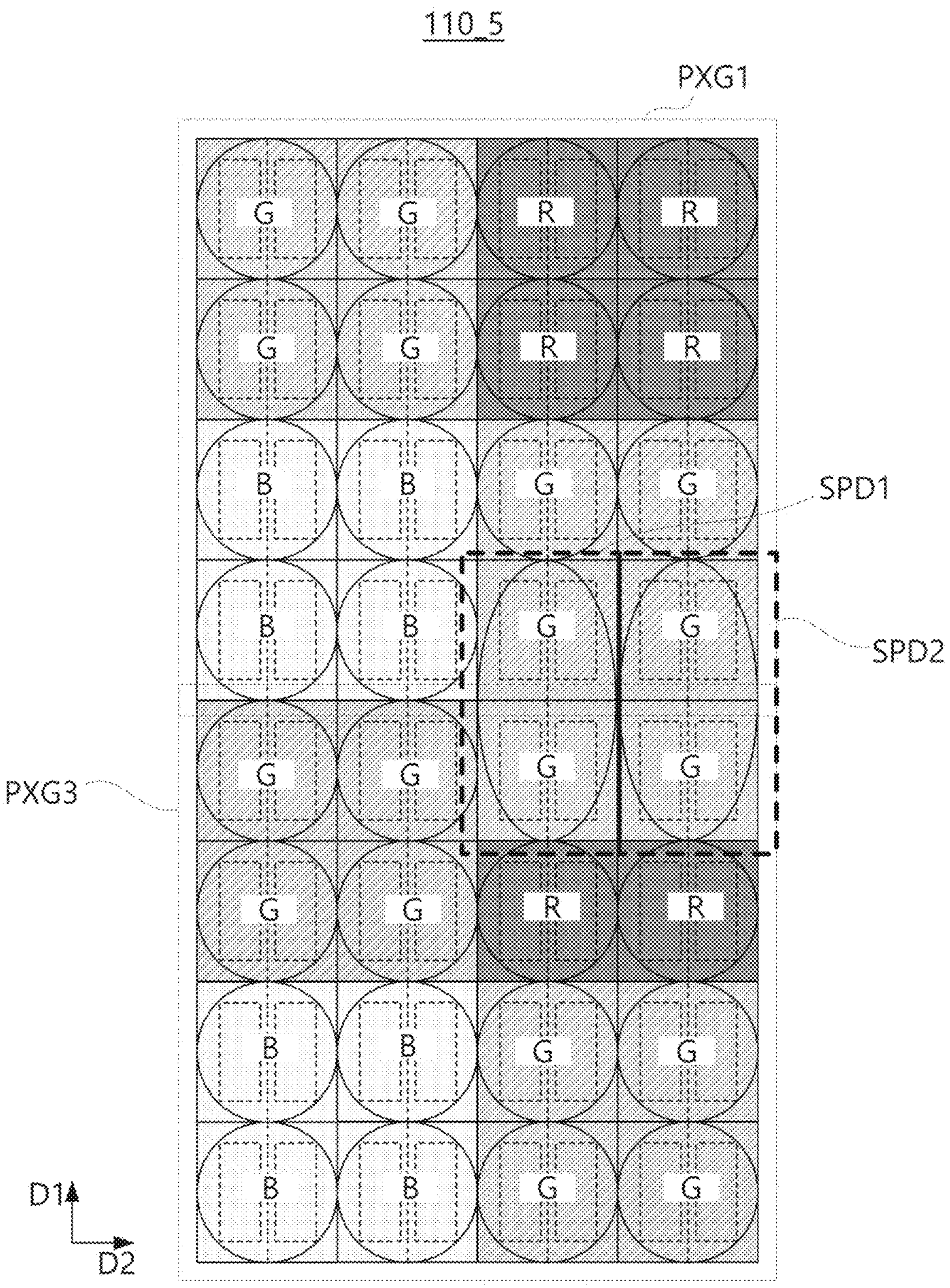

FIG. 13 is a diagram describing a pixel array according to another embodiment. FIG. 13 shows some pixel groups of a pixel array. Additional description that is the same as the description given with reference to the above drawings will be omitted to avoid redundancy.

In a pixel array 110_5 according to an embodiment, as illustrated in FIG. 13, pixels constituting each of super photodiode pixels SPD1 and SPD2 are adjacent to each other in a direction different from a direction in which a plurality of photoelectric conversion elements are adjacent to each other. For example, each of pixels of the pixel array 110_5 includes a plurality of photoelectric conversion elements adjacent to each other in the second direction D2. The pixels of each of the super photodiode pixels SPD1 and SPD2 are disposed adjacent to each other in the first direction D1.

An example in which pixel groups PXG1 and PXG3 adjacent to each other in the first direction D1 share two super photodiode pixels SPD1 and SPD2 is illustrated in FIG. 13; however, according to an embodiment, the pixel groups PXG1 and PXG3 may share one super photodiode pixel.

According to an embodiment, the sharing of the super photodiode pixel may be made in all the pixel groups of the pixel array 110_5, or the sharing of the super photodiode pixel may be made in some pixel groups.

Figure 14:
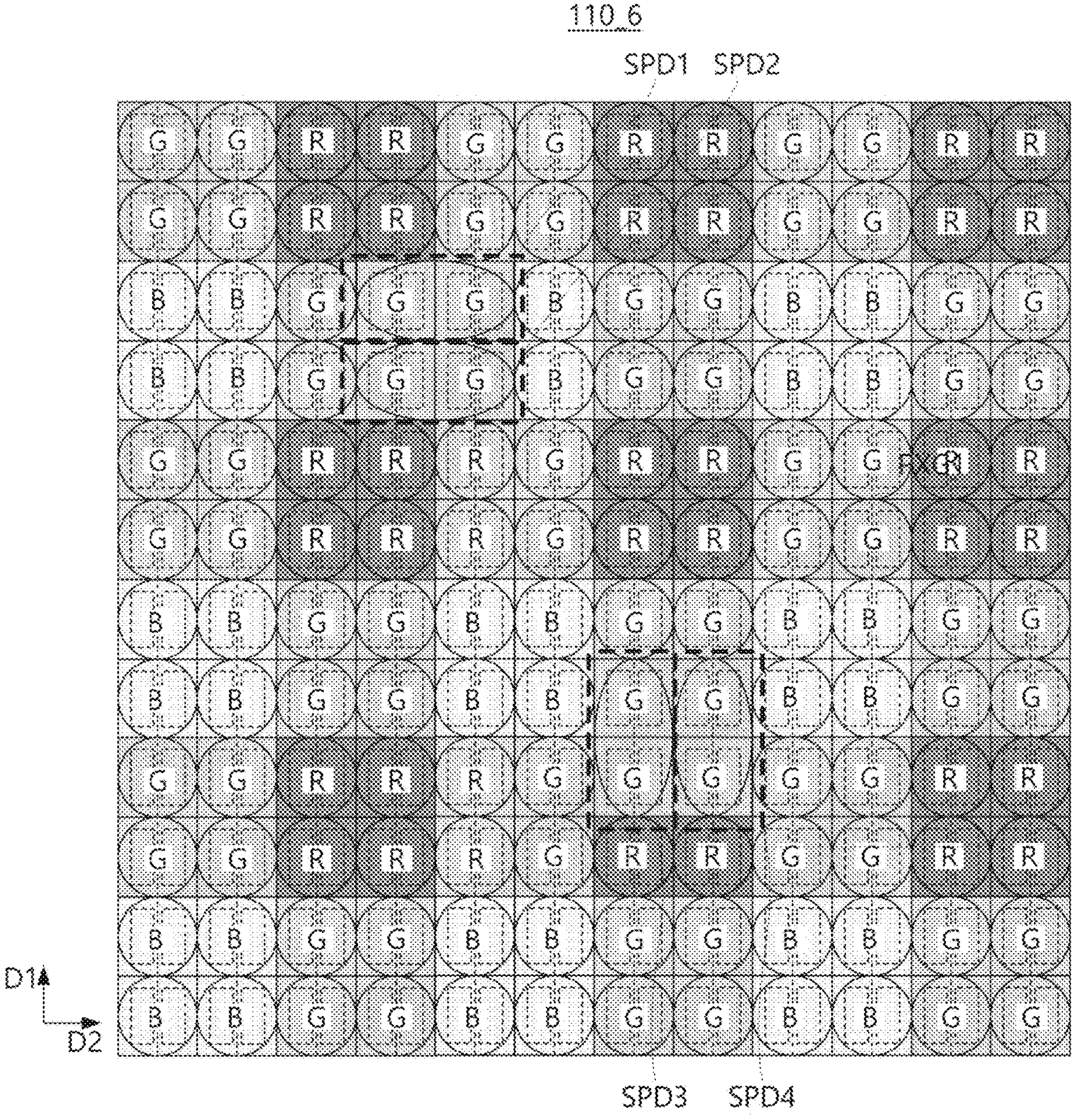

FIG. 14 is a diagram describing a pixel array according to another embodiment. FIG. 14 shows some pixel groups of a pixel array. Additional description that is the same as the description given with reference to the above drawings will be omitted to avoid redundancy.

In a pixel array 110_6 according to an embodiment illustrated in FIG. 14, directions in which pixels of super photodiode pixels are adjacent to each other may be different from each other.

For example, pixels of each of super photodiode pixels SPD1 and SPD2 are disposed adjacent to each other in the second direction D2. Pixels of each of super photodiode pixels SPD3 and SPD4 are disposed adjacent to each in the first direction D1.

Also, directions in which pixel groups sharing super photodiode pixels are adjacent to each other are different from each other. For example, pixel groups sharing the super photodiode pixels SPD1 and SPD2 are disposed adjacent to each other in the second direction D2. Pixel groups sharing the super photodiode pixels SPD3 and SPD4 are disposed adjacent to each in the first direction D1.

According to an embodiment, the sharing of the super photodiode pixel may be made in all the pixel groups of the pixel array 110_6, or the sharing of the super photodiode pixel may be made in some pixel groups.

Figure 15:
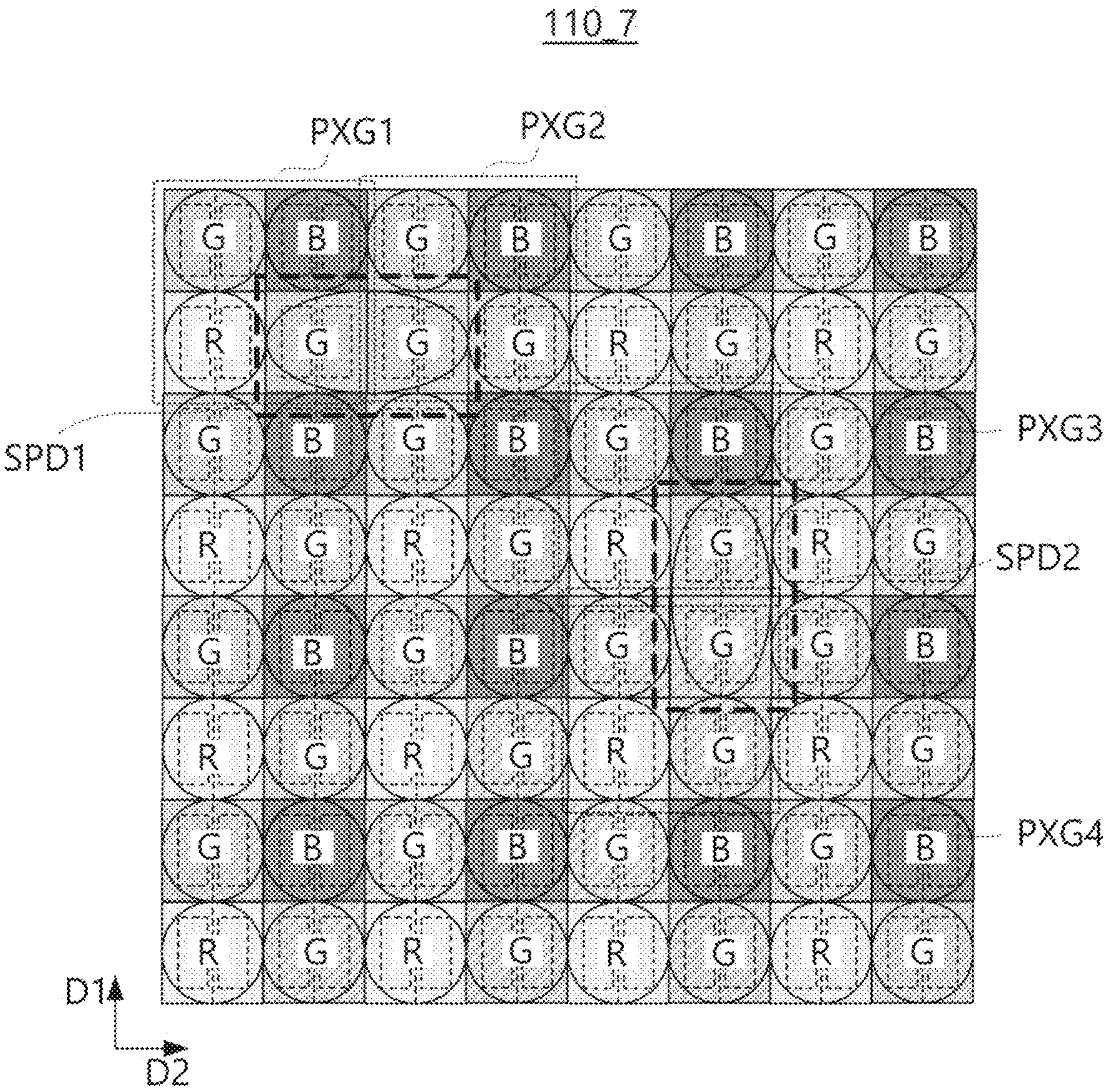

FIG. 15 is a diagram describing a pixel array according to another embodiment. FIG. 15 shows some pixel groups of a pixel array. Additional description that is the same as the description given with reference to the above drawings will be omitted to avoid redundancy.

A pixel array 110_7 according to an embodiment illustrated in FIG. 15 includes a plurality of pixel groups. Unlike embodiments discussed above, each pixel group does not include sub-pixel groups. Each pixel group may include a color filter of the Bayer pattern. According to an embodiment, each pixel group may include various color filter structures such as RGBW, RYB, and CMYG.

In an embodiment, the pixel array 110_7 may include a super photodiode pixel SPD1 composed of pixels disposed adjacent to each other in the second direction D2 and a super photodiode pixel SPD2 composed of pixels disposed adjacent to each other in the first direction D1. Accordingly, pixel groups PXG1 and PXG2 sharing the super photodiode pixel SPD1 are adjacent to each other in the second direction D2. Pixel groups PXG3 and PXG4 sharing the super photodiode pixel SPD2 are adjacent to each other in the first direction D1.

According to an embodiment, the pixel array 110_7 may only include super photodiode pixels each composed of pixels disposed adjacent to each other in the first direction D1. Alternatively, the pixel array 110_7 may only include super photodiode pixels each composed of pixels disposed adjacent to each other in the second direction D2.

According to an embodiment, the sharing of the super photodiode pixel may be made in all the pixel groups of the pixel array 110_7, or the sharing of the super photodiode pixel may be made in some pixel groups.

Figure 16:
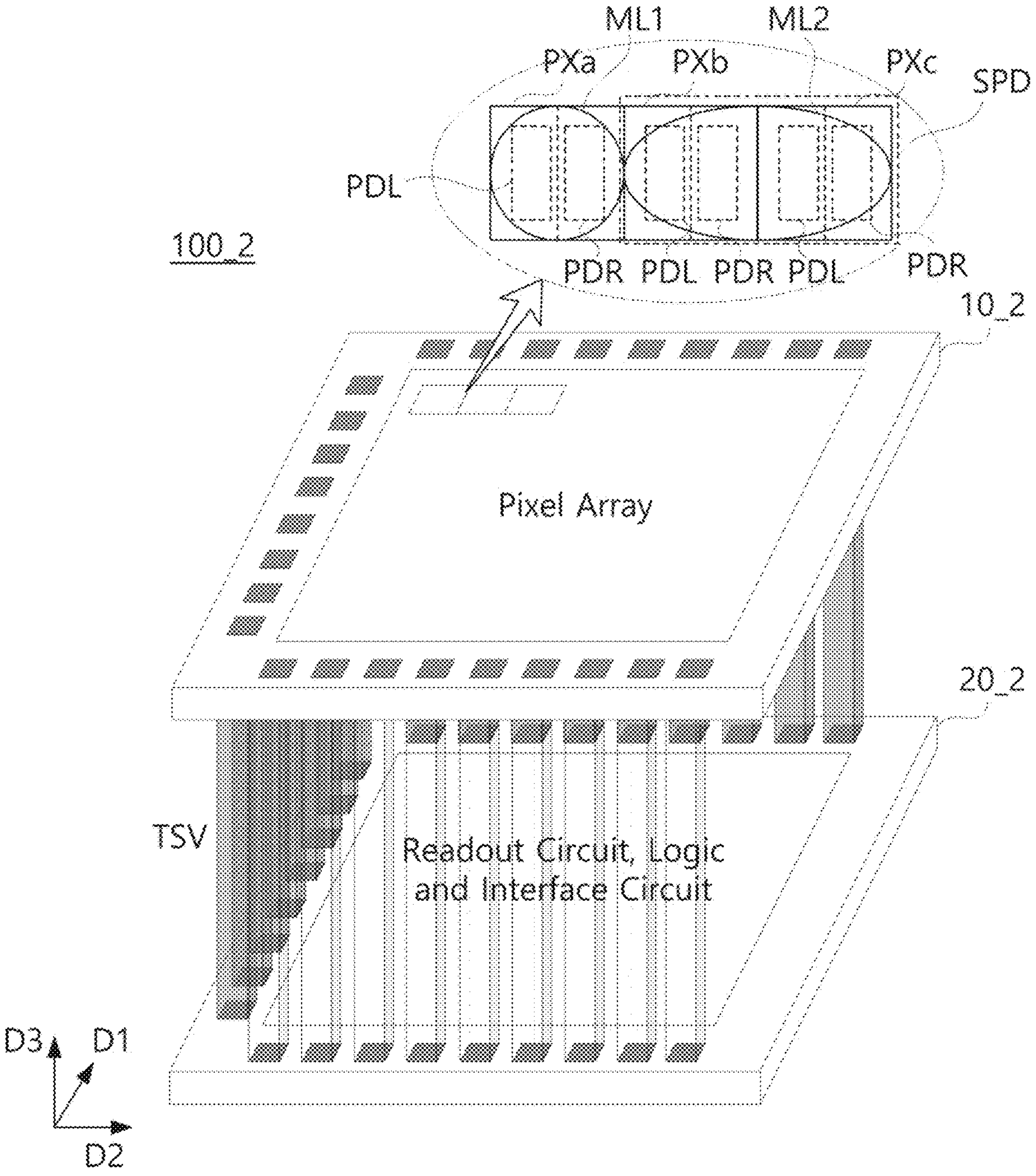
FIGS. 16 and 17 are block diagrams of an image sensor according to an embodiment.

FIG. 16 is a block diagram of an image sensor according to an embodiment. Additional description that is the same as the description given with reference to the above drawings will be omitted to avoid redundancy.

An image sensor 100_2 may include a first chip 10_2 and a second chip 20_2.

The first chip 10_2 may be stacked on the second chip 20_2 in a third direction D3, for example. The first chip 10_2 and the second chip 20_2 may be electrically connected. For example, the first chip 10_2 and the second chip 20_2 may exchange pixel signals or control signals through a through silicon via (TSV) between pads placed in a chip peripheral area. As described with reference to FIG. 3, the first chip 10_2 and the second chip 20_2 may be electrically connected through the in-cell contact. A pixel signal (or pixel data) of the first chip 10_2 may be transmitted to a readout circuit (or image signal processing logic) of the second chip 20_2.

The first chip 10_2 according to an embodiment may include one of the pixel arrays 110, 110_2, 110_3, 110_4, 110_5, 110_6, and 110_7 described above. Each of the pixels PXa, PXb, and PXc of the pixel array may include the plurality of photoelectric conversion elements PDL and PDR. The pixel array may include the dual photodiode pixel PXa and the super photodiode pixel SPD. The dual photodiode pixel PXa may include one micro lens ML1. The pixels PXb and PXc constituting the super photodiode pixel SPD may share one micro lens ML2. The pixels PXa, PXb, and PXc of the pixel array may differently operate depending on autofocus modes and may output pixel signals.

The second chip 20_2 may include logic, such as a readout circuit, a timing controller, and image signal processing logic, and an interface circuit. The second chip 20_2 may provide the first chip 10_2 with a control signal for controlling the dual photodiode pixel PXa of the pixel array or the pixels PXb and PXc constituting the super photodiode pixel.

The image signal processing logic of the second chip 20_2 may differently output phase data depending on autofocus modes. The image signal processing logic may output phase data based on a dual photodiode pixel in the first autofocus mode and may output phase data based on a super photodiode pixel in the second autofocus mode.

Figure 17:
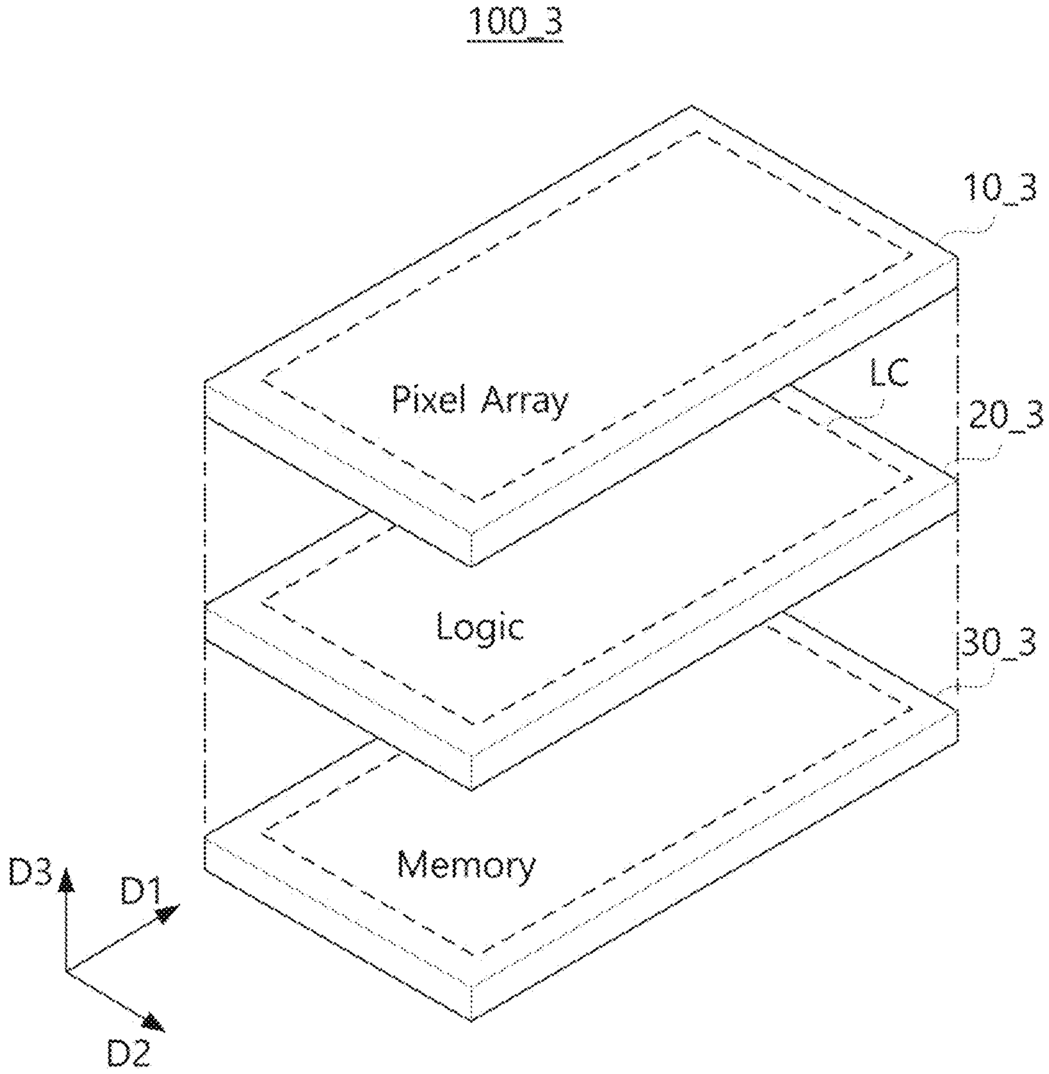

FIG. 17 is a block diagram of an image sensor according to an embodiment. Additional description that is the same as the description given with reference to the above drawings will be omitted to avoid redundancy.

Referring to FIG. 17, an image sensor 100_3 may further include a third chip 30_3. The third chip 30_3, a second chip 20_3, and a first chip 10_3 may be sequentially stacked in the third direction D3. The third chip 30_3 may include a memory device. For example, the third chip 30_3 may include a volatile memory device such as a DRAM or an SRAM. The third chip 30_3 may receive signals from the first chip 10_3 and the second chip 20_3 and may process the received signals through the memory device.

Figure 18:
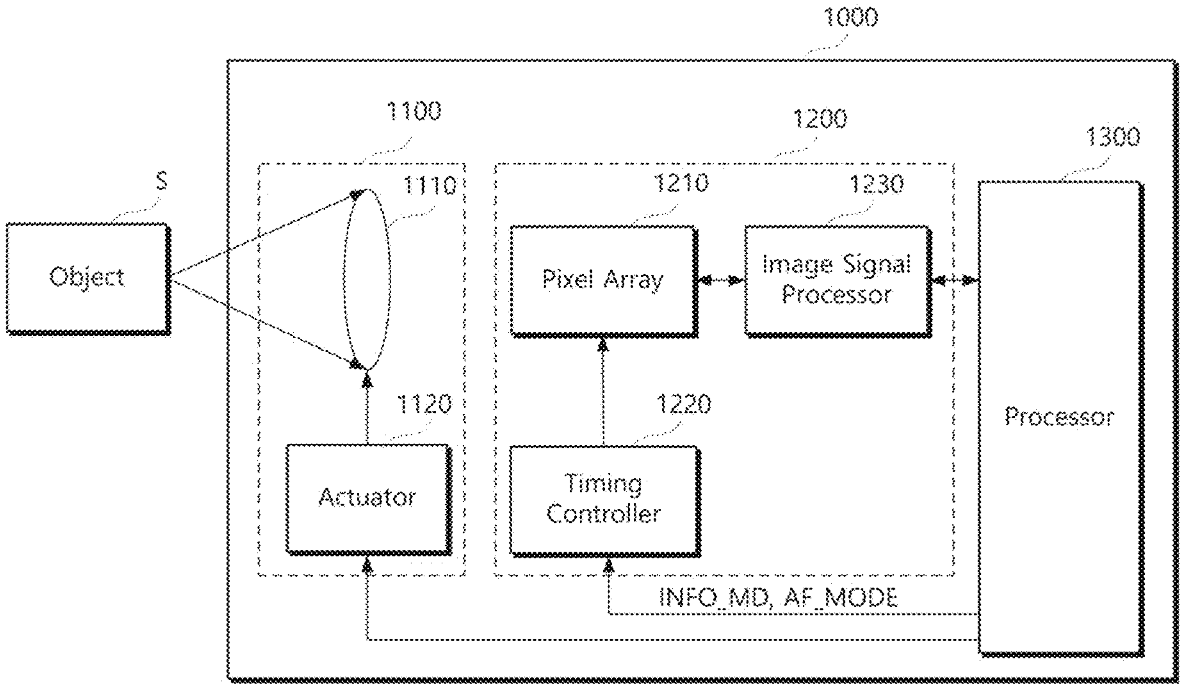
FIG. 18 is a block diagram of an electronic device according to an embodiment.

FIG. 18 is a block diagram of an electronic device according to an embodiment. Additional description that is the same as the description given with reference to the above drawings will be omitted to avoid redundancy.

An electronic device 1000 may include a lens 1100, an image sensor 1200, and a processor 1300. The electronic device 1000 may perform auto focusing based on phase data provided from the image sensor 1200 to the processor 1300.

The processor 1300 may control an overall operation of the electronic device 1000. The processor 1300 may provide a control signal to a lens driving part 1120 to control a location of a lens 1110. As such, a focal length may be controlled.

The lens 1100 that is a component receiving a light may include the lens 1110 and the lens driving part 1120. The lens 1110 may include a plurality of lenses.

The lens driving part 1120 may move the lens 1110 (i.e., one or more of the plurality of lenses) in a direction in which a distance from an object "S" increases or decreases, based on the control signal of the processor 1300.

The image sensor 1200 may generate image data and phase data based on an incident light. The image sensor 1200 may include a pixel array 1210, a timing controller 1220, and an image signal processor 1230.

The pixel array 1210 may be one of the pixel arrays 110, 110_2, 110_3, 110_4, 110_5, 110_6, and 110_7 described above.

The pixel array 1210 may include a dual photodiode pixel and a super photodiode pixel. Each of pixels of the pixel array 1210 includes a plurality of photoelectric conversion elements.

The pixel array 1210 according to an embodiment may operate in a plurality of autofocus modes. In the first autofocus mode, the pixel array 1210 may provide the processor 1300 with phase data based on dual photodiode pixels. In the second autofocus mode, the pixel array 1210 may provide the processor 1300 with phase data based on super photodiode pixels. Accordingly, the electronic device 1000 according to an embodiment may selectively perform accurate auto focusing or high-speed auto focusing depending on a photographing environment.

The processor 1300 may calculate a disparity by using the phase data. Based on a disparity calculation result, the processor 1300 may provide a control signal to the lens driving part 1120 for the purpose of moving the location of the lens 1110.

The processor 1300 may provide an operation mode control signal INFO_MD and the autofocus mode control signal AF_MODE to the timing controller 1220. The timing controller 1220 may control the operation of the pixel array 1210 based on the operation mode control signal INFO_MD and the autofocus mode control signal AF_MODE. The autofocus mode control signal AF_MODE is a signal that controls the image sensor 1200 to operate in the first autofocus mode or to operate in the second autofocus mode.

Figure 19:
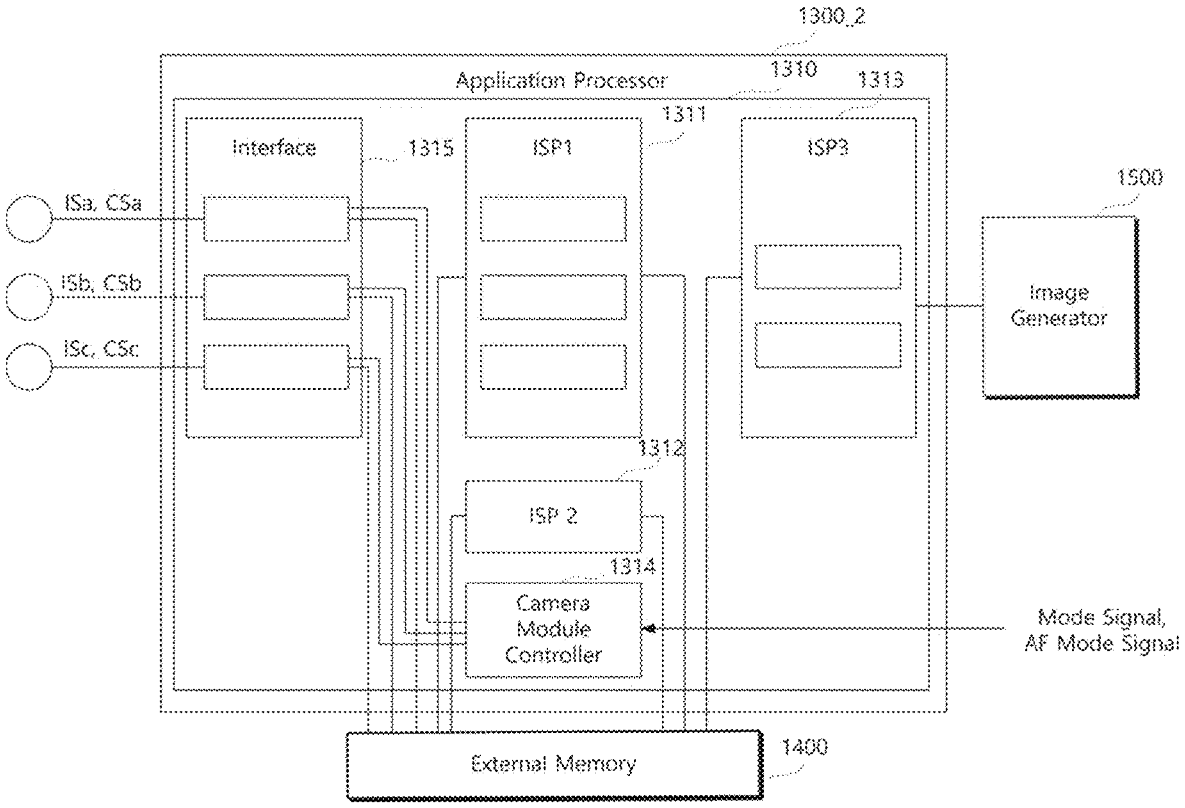
FIG. 19 is a block diagram of an application processor according to an embodiment.

FIG. 19 is a block diagram of an application processor according to an embodiment. Additional description that is the same as the description given with reference to the above drawings will be omitted to avoid redundancy.

An application processor 1300_2 may include an image signal processing device 1310. The image signal processing device 1310 may include a plurality of image signal processors ISP1, ISP2, and ISP3, a camera module controller 1314, and a camera interface 1315.

The camera module controller 1314 may transmit control signals CSa, CSb, and CSc to a plurality of camera modules based on a mode signal and an AF mode signal. An example in which the control signals CSa, CSb, and CSc are transmitted to three camera modules is illustrated in FIG. 19, but the present disclosure is not limited thereto. According to an embodiment, the camera module controller 1314 may transmit control signals to one camera module, may transmit control signals to two camera modules or may transmit control signals to four or more camera modules.

Image signals ISa, ISb, and ISc may be provided from the plurality of cameras through the camera interface 1315 and may be stored in an external memory 1400. The image signal processors ISP1 and ISP2 may process the image signals ISa, ISb, and ISc stored in the external memory 1400 and may control the processed result to be displayed on a display, or the image signal processors ISP1 and ISP2 may process the image signals ISa, ISb, and ISc stored in the external memory 1400 and may perform auto focusing based on the processed result. The image signals ISa, ISb, and ISc may include image data and phase data. The image signals ISa, ISb, and ISc stored in the external memory 1400 may be encoded image signals. The image signal processors ISP1 and ISP2 may read the encoded image signals from the external memory 1400, may decode the encoded image signals thus read, and may display image data generated based on the decoded image signals.

A configuration of a camera module will be described in detail with reference to FIG. 20.

Figure 20:
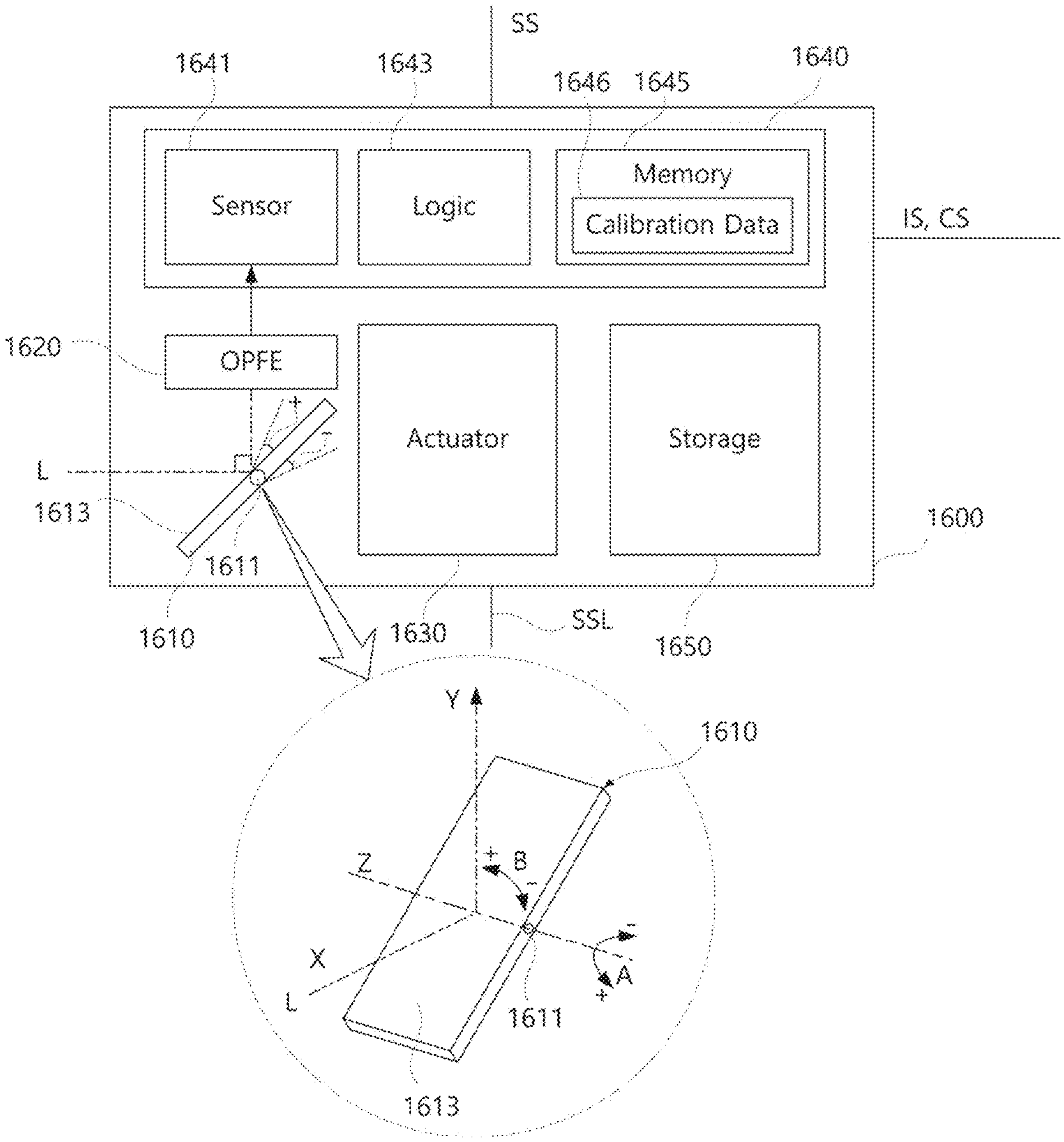
FIG. 20 is a block diagram of a camera module of an electronic device according to an embodiment.

Referring to FIG. 20, a camera module 1600 may include a prism 1610, an optical path folding element (OPFE) 1620, an actuator 1630, an image sensing device 1640, and storage 1650.

The prism 1610 may include a reflecting plane 1613 of a light reflecting material and may change a path of a light "L" incident from the outside. The prism 1610 may change the path of the light "L" incident in a first direction "X" to a second direction "Y" by rotating the reflecting plane 1613 of the light reflecting material in direction "A" or direction "B" about a central axis 1106. The second direction "Y" may be perpendicular to the first direction "X". As the central axis 1106 rotates, the OPFE 1620 may also move in a third direction "Z" perpendicular to the first direction "X" and the second direction "Y".

The OPFE 1620 may include a plurality of optical lens groups, for example. A plurality of lenses may move in the second direction "Y" to change an optical zoom ratio of the camera module 1600.

The actuator 1630 may move the OPFE 1620 or at least some of the optical lenses to a specific location. The actuator 1630 may control locations of lenses based on a control signal CS provided from a processor.

The image sensing device 1640 may include an image sensor 1641, logic 1643, and a memory 1645. The image sensor 1641 may generate an electrical signal based on the light "L" provided through the optical lens.

Each of pixels of the image sensor 1641 according to an embodiment includes a plurality of photoelectric conversion elements. In some pixels each corresponding to a dual photodiode pixel, a plurality of photoelectric conversion elements may share one micro lens. Some pixels constitute a super photodiode pixel. The pixels constituting the super photodiode pixel may share one micro lens.

The memory 1645 may store data necessary for the operation of the camera module 1600. For example, the memory 1645 may store calibration data 1646. The calibration data 1646 may include information about a focal length, information about an optical axis, etc. According to an embodiment, the calibration data 1646 may include a focal length value for each optical lens location and information about auto focusing.

The memory 1645 according to an embodiment may store coordinate information of pixels constituting super photodiode pixels.

The storage 1650 may store image data sensed through the image sensor 1641. The storage 1650 may be disposed outside the image sensing device 1640 and may be implemented in a shape where the storage 1650 and a sensor chip constituting the image sensing device 1640 are stacked like FIG. 17.

The logic 1643 according to an embodiment may be image signal processing logic. The logic 1643 may control an overall operation of the camera module 1600. The logic 1643 may control an operation of the camera module 1600 in response to the control signal CS from the outside. The logic 1643 may process image data sensed through the image sensor 1641. For example, the logic 1643 may perform crosstalk correction, auto dark compensation, etc. with respect to the image data. The logic 1643 may generate phase data in different autofocus modes with reference to the coordinate information of the super photodiode pixels stored in the memory 1645. The logic 1643 may generate phase data based on a dual photodiode pixel in the first autofocus mode. The logic 1643 may generate phase data based on a super photodiode pixel in the second autofocus mode. The logic 1643 may operate in the first autofocus mode or the second autofocus mode based on the control signal CS from the processor.

The camera module 1600 may transmit an image signal IS including image data and phase data to the outside.

In some embodiments, the camera module 1600 may be provided with a sink signal SS from the application processor 1300_2. The sink signal SS may be differently provided to a plurality of cameras constituting a camera module group.

An image sensor according to the present disclosure may operate in a plurality of autofocus modes in consideration of accuracy and speed.

An electronic device according to the present disclosure may allow an image sensor to operate in a plurality of autofocus modes in consideration of accuracy and speed.

In some example embodiments, each of the components represented by a block as illustrated in FIGS. 1, 8 and 18-20 may be implemented as various numbers of hardware, and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that is configured to execute the respective functions through controls of one or more microprocessors or other control apparatuses. Also, at least one of these components may further include or may be implemented by a processor such as a central processing unit (CPU) that performs the respective functions, a microprocessor, or the like.

While aspects of embodiments have been particularly shown and described, it will be understood that various changes in form and details may be made therein without departing from the spirit and scope of the following claims.

What is claimed is:

1. A pixel array comprising:

a plurality of pixels in a matrix, the plurality of pixels comprising a first pixel, a second pixel and a third pixel adjacent the second pixel;

a plurality of micro lenses, the plurality of micro lenses comprising a first micro lens and a second micro lens, wherein each of the plurality of pixels comprises a plurality of photoelectric conversion elements adjacent to each other in a first direction, wherein the first micro lens extends across the plurality of photoelectric conversion elements of the first pixel, wherein the second micro lens extends in the first direction or a second direction across the second pixel and the third pixel, wherein the plurality of pixels are divided into a plurality of pixel groups, wherein each of the plurality of pixel groups comprises at least four of the plurality of pixels, wherein each pixel group of the plurality of pixel groups is disposed under more than three color filters having at least three different colors, and wherein the second pixel and the third pixel are respectively provided in different pixel groups adjacent to each other from among the plurality of pixel groups.

2. The pixel array of claim 1, wherein each of the plurality of pixel groups comprises a plurality of sub-pixel groups, wherein each of the plurality of sub-pixel groups comprises pixels, from among the plurality of pixels, arranged in an m by n matrix (m and n being natural numbers of 2 or more), and wherein the pixel group comprising the second pixel and the pixel group comprising the third pixel comprise a different number of pixels corresponding to a same color filter among the three color filters.

3. The pixel array of claim 1, wherein each of the second pixel and the third pixel comprises a color filter configured to transmit light of a same wavelength band.

4. The pixel array of claim 1, wherein the plurality of pixels comprises a fourth pixel and a fifth pixel adjacent to the fourth pixel, wherein the plurality of micro lenses comprises a third micro lens that extends across the fourth pixel and the fifth pixel, and wherein a direction in which the fourth pixel and the fifth pixel are arranged is different from a direction in which the second pixel and the third pixel are arranged.

5. The pixel array of claim 1, wherein the plurality of pixels comprises a fourth pixel and a fifth pixel adjacent to the fourth pixel, wherein the plurality of micro lenses comprises a third micro lens that extends across the fourth pixel and the fifth pixel, wherein a direction in which the fourth pixel and the fifth pixel are arranged is identical to a direction in which the second pixel and the third pixel are arranged, and wherein the fourth pixel and the fifth pixel are respectively provided adjacent to the second pixel and the third pixel.

6. The pixel array of claim 5, wherein the third micro lens extends across the second pixel, the third pixel, the fourth pixel and the fifth pixel.

7. The pixel array of claim 1, wherein the pixel array is configured to individually sample pixel signals of the plurality of photoelectric conversion elements in one of the plurality of pixels while operating in a first autofocus mode, and to simultaneously sample the pixel signals of the plurality of photoelectric conversion elements in the one of the plurality of pixels while operating in a second autofocus mode.

8. An image sensor comprising:

a pixel array comprising a plurality of pixels in a matrix and a plurality of micro lenses, the plurality of pixels comprising a first pixel, a second pixel and a third pixel adjacent the second pixel, and the plurality of micro lenses comprising a first micro lens and a second micro lens;

a row decoder circuit configured to provide a transfer control signal to the pixel array through a plurality of control signal lines;

a control logic circuit configured to control the row decoder circuit; and an image signal processing logic circuit configured to output image data and phase data based on an output of the pixel array, wherein each of the plurality of pixels comprises a plurality of photoelectric conversion elements adjacent to each other in a first direction, wherein the first micro lens extends across the plurality of photoelectric conversion elements of the first pixel, wherein the second micro lens extends in the first direction or a second direction across the second pixel and the third pixel, and wherein the row decoder circuit is further configured to:

output the transfer control signal to each of the plurality of pixels in a first mode to control pixel signals of the plurality of pixels to be sampled in different output time periods; and output the transfer control signal to each of the plurality of pixels in a second mode to control the pixel signals of the plurality of pixels to be simultaneously sampled in a common output time period.

9. The image sensor of claim 8, wherein the image signal processing logic circuit is further configured to output the image data based on a result of performing bad pixel correction processing with respect to the second pixel and the third pixel.

10. The image sensor of claim 8, further comprising a memory device configured to store coordinate information of the second pixel and the third pixel.

11. The image sensor of claim 8, wherein the image signal processing logic circuit is further configured to output the phase data based on outputs of different pixels, among the plurality of pixels, in a plurality of autofocus modes, and wherein the plurality of autofocus modes comprises the first mode and the second mode.

12. The image sensor of claim 11, wherein the plurality of autofocus modes are switched based on a first mode signal and a second mode signal.

13. The image sensor of claim 11, wherein the image signal processing logic circuit is further configured to:

output the phase data based on an output of the first pixel in the first mode; and output the phase data based on outputs of the second pixel and the third pixel in the second mode.

14. The image sensor of claim 11, wherein each of the plurality of pixels comprises a floating diffusion region to which charges accumulated by the plurality of photoelectric conversion elements are transferred, and wherein, in the first mode, the first pixel is controlled such that the plurality of photoelectric conversion elements of the first pixel transfer charges to the floating diffusion region of the first pixel in different output time periods.

15. The image sensor of claim 11, wherein each of the plurality of pixels comprises a floating diffusion region to which charges accumulated by the plurality of photoelectric conversion elements are transferred, and wherein, in the second mode, the first pixel is controlled such that the plurality of photoelectric conversion elements of the first pixel transfer charges to the floating diffusion region of the first pixel in a common output time period.

16. The image sensor of claim 8, wherein the second pixel and the third pixel are adjacent to each other in the first direction or the second direction, and wherein the second direction crosses the first direction.

17. The image sensor of claim 8, further comprising an interface circuit configured to transmit the image data and the phase data to an external device, and wherein the interface circuit is further configured to transmit the phase data based on outputs of different pixels, in a plurality of autofocus modes.

18. The image sensor of claim 17, wherein the interface circuit is further configured to:

transmit the image data and the phase data generated based on an output of the first pixel to different virtual channels, in the first mode; and add, as a tail, the phase data generated based on outputs of the second pixel and the third pixel to the image data generated based on the output of the first pixel so as to be transmitted to a common virtual channel, in the second mode.

19. An electronic device comprising:

an image sensing device comprising a pixel array, the pixel array comprising a plurality of pixels in a matrix, a plurality of micro lenses and a logic circuit configured to control the pixel array, and the image sensing device being configured to output image data and phase data based on an output of the pixel array; and a processor configured to receive the image data and the phase data from the image sensing device, to obtain a disparity of the phase data based on the phase data, and to provide a control signal to the image sensing device based on the disparity, wherein the pixel array comprises a plurality of pixel groups comprising the plurality of pixels, wherein the plurality of pixels comprises a first pixel, a second pixel and a third pixel adjacent the second pixel, wherein the plurality of micro lenses comprises a first micro lens and a second micro lens, wherein each of the plurality of pixels comprises a plurality of photoelectric conversion elements adjacent to each other in a first direction, wherein the pixel array is configured to output the phase data based on an output of the first pixel while operating in a first mode, and output the phase data based on outputs of the second pixel and the third pixel while operating in a second mode, wherein the first micro lens extends across the plurality of photoelectric conversion elements of the first pixel, and wherein the second micro lens extends in the first direction or a second direction across the second pixel and the third pixel.

20. The electronic device of claim 19, wherein the processor is further configured to:

selectively transmit, to the image sensing device, a first control signal and a second control signal to control a mode, from among a plurality of modes of generating phase data, wherein the first control signal indicates the phase data is to be output based on the first mode, and wherein the second control signal indicates the phase data is to be output based on the second mode.

* * * * *